(12) United States Patent
Kim et al.

(10) Patent No.: US 10,541,058 B2
(45) Date of Patent: Jan. 21, 2020

(54) PASSIVE SAFETY SYSTEM AND NUCLEAR POWER PLANT COMPRISING SAME

(71) Applicant: KOREA ATOMIC ENERGY RESEARCH INSTITUTE, Daejeon (KR)

(72) Inventors: Young In Kim, Daejeon (KR); Suhn Choi, Daejeon (KR); Keung Koo Kim, Daejeon (KR); Young Min Bae, Daejeon (KR); Soo Jai Shin, Sejong (KR)

(73) Assignee: KOREA ATOMIC ENERGY RESEARCH INSTITUTE, Daejeon (KR)

( * ) Notice: Subject to any disclaimer, the term of this patent is extended or adjusted under 35 U.S.C. 154(b) by 355 days.

(21) Appl. No.: 15/505,019

(22) PCT Filed: Aug. 19, 2015

(86) PCT No.: PCT/KR2015/008636
§ 371 (c)(1),
(2) Date: Feb. 17, 2017

(87) PCT Pub. No.: WO2016/028073
PCT Pub. Date: Feb. 25, 2016

(65) Prior Publication Data
US 2017/0263340 A1    Sep. 14, 2017

(30) Foreign Application Priority Data

Aug. 19, 2014   (KR) ........................ 10-2014-0107928

(51) Int. Cl.
*G21C 15/18*      (2006.01)
*G21C 15/24*      (2006.01)

(52) U.S. Cl.
CPC ......... *G21C 15/182* (2013.01); *G21C 15/185* (2019.01); *G21C 15/24* (2013.01)

(58) Field of Classification Search
CPC .... G21C 15/182; G21C 15/185; G21C 15/24; G21C 9/012
(Continued)

(56) References Cited

U.S. PATENT DOCUMENTS

| | | | | |
|---|---|---|---|---|
| 2012/0294737 A1* | 11/2012 | Singh | ................... | G21C 15/243 417/410.1 |
| 2014/0177775 A1* | 6/2014 | Loewen | .................. | G21F 5/008 376/272 |
| 2017/0004892 A1* | 1/2017 | Kim | ....................... | G21C 15/18 |

FOREIGN PATENT DOCUMENTS

JP    2013-145161    *    7/2013
KR    101242746 B1    *    3/2013

* cited by examiner

*Primary Examiner* — Jack W Keith
*Assistant Examiner* — Daniel Wasil
(74) *Attorney, Agent, or Firm* — Scully, Scott, Murphy & Presser, P.C.

(57) ABSTRACT

A passive safety system comprises a heat exchanger, a thermoelectric element, and a fan unit. The heat exchanger is located inside a containment. The heat exchanger allows for temperature of atmosphere in the containment to be reduced. The thermoelectric element is disposed within the heat exchanger. The thermoelectric element is configured to generate electricity due to a temperature difference. The fan unit receives electricity generated by the thermoelectric element. The fan unit is configured to increase flow rate of fluid inside the containment. A nuclear power plant can include the passive safety system.

13 Claims, 14 Drawing Sheets

(58) Field of Classification Search
USPC .................................. 376/282, 298, 299, 321
See application file for complete search history.

PASSIVE SAFETY SYSTEM AND NUCLEAR POWER PLANT COMPRISING SAME

CROSS-REFERENCE TO RELATED APPLICATIONS

This application is the National Stage filing under 35 U.S.C. 371 of International Application No. PCT/KR2015/008636, filed on Aug. 19, 2015, which claims the benefit of earlier filing date and right of priority to Korean Application No. 10-2014-0107928, filed on Aug. 19, 2014, the contents of which are all hereby incorporated by reference herein in their entirety.

TECHNICAL FIELD

The present invention relates to facilities for preparing an accident mitigation of a nuclear power plant, and more particularly, a passive safety system, which uses a heat exchanger together with a thermoelectric element upon an occurrence of an accident of a nuclear power plant, and a nuclear power plant having the same.

BACKGROUND ART

Types of reactors may be divided according to a configuration of a safety system and installation locations of main components. First, reactors are divided into active reactors using active power such as a pump, and passive reactors using passive power such as a gravity force, gas pressure or the like according to the configuration of the safety system. Next, reactors are divided according to the installation locations of the main components into loop type reactors (for example, Korean pressurized water reactor) in which main components (a steam generator, a pressurizer, a pump impeller, etc.) are installed at an outside of a reactor vessel, and integrated type reactors (for example, Korean SMART reactor) in which the main components are installed at an inside of the reactor vessel.

In general, a containment structure for protecting an outside of the reactor vessel (or reactor coolant system of a loop type reactor) is referred to as a containment building (or reactor building) when the structure is constructed using reinforced concrete, and as a containment vessel (safeguard vessel for a small structure) when the structure is manufactured using a steel. In this specification, the containment building, the reactor building, the containment vessel, the safeguard vessel and the like, unless otherwise specified, are commonly referred to as "containment."

In a nuclear power plant industrial field, a passive containment cooling system (or containment cooling system) is widely used as a system of maintaining soundness of the containment by reducing pressure in a manner of condensing steam and cooling internal atmosphere, when internal pressure of the containment increases due to a discharge of coolant or steam, which results from a loss-of-coolant accident or steam line break accident occurred in various reactors including such integral reactor. As methods used for similar purposes to the passive containment cooling system, a method using a suppression tank in which steam discharged into the containment is induced into the suppression tank and condensates the steam (Commercial BWR, CAREM: Argentina, IRIS: U.S. Westinghouse, etc.), a method of applying a steel containment vessel and cooling (spray, air) an outer wall (AP1000: U.S. Westinghouse), and a method using a heat exchanger (SWR1000: Framatome ANP of France, AHWR: India, SBWR: GE of USA) and the like are currently used. A shell and tube type heat exchanger or condenser (SBWR: GE of USA, etc.) is generally applied as a heat exchanger of a passive containment cooling system related to the present invention, and the heat exchanger depends on natural circulation.

In the nuclear power plant industrial field related to the present invention, a residual heat removal system (auxiliary feedwater system or passive residual heat removal system) is employed as a system for removing heat of the reactor coolant system (sensible heat in the reactor coolant system and residual heat of the core) when an accident occurs in various nuclear power plants including the integral reactor. Among those residual heat removal systems, two methods, such as a method of directly circulating primary coolant of the reactor coolant system to cool a reactor (AP1000: U.S. Westinghouse) and a method of indirectly circulating secondary coolant using a steam generator to cool a reactor (SMART reactor: Korea) are mostly used as fluid circulation methods of the passive residual heat removal system using natural circulation based on a density difference between steam and water, and a direct condensation method of injecting primary coolant into a tank (CAREM: Argentina) is partially used.

Furthermore, as methods of cooling an outside of a heat exchanger (condensation heat exchanger) of the passive residual heat removal system, a water-cooling method (AP1000) applied to most of reactors, some air-cooling methods (WWER 1000: Russia), and a water-air hybrid cooling method (IMR: Japan) are currently used. A heat exchanger of the passive residual heat removal system performs a function of transferring heat delivered from a reactor to an outside (ultimate heat sink) through an emergency cooling tank or the like, and condensation heat exchangers using a steam condensation phenomenon with excellent heat transfer efficiency are widely employed as a heat exchanger type.

In relation to the present invention, a printed circuit heat exchanger has been developed by the Heatric Ltd. in UK (U.S. Pat. No. 4,665,975, 1987), and is very variously used in general industrial fields. The printed circuit heat exchanger is a heat exchanger having a structure in which welding between plates of the heat exchanger is removed using a dense flow channel arrangement by a photo-chemical etching technique and diffusion bonding. Accordingly, the printed circuit heat exchanger is applicable to high-temperature and high-pressure conditions and has high accumulation and excellent heat transfer efficiency. The advantages of the printed circuit heat exchanger, such as durability against the high-temperature and high-pressure environments, the high accumulation and the excellent heat transfer efficiency, extend an application range of the printed circuit heat exchanger to various fields, such as an evaporator used in a very low temperature environment and the like, a condenser, a cooler, a radiator, a heat exchanger, a reactor, an air conditioning system, a fuel cell, a vehicle, a chemical process, a medical instrument, nuclear power plant, an information communication device.

Meanwhile, a plate type heat exchanger, which is to be used as one of examples according to the present invention, has been widely applied in industrial fields over one hundred years. The plate type heat exchanger is generally configured such that plates are pressed out to form flow channels and then the pressed plates are joined to each other using gaskets or by typical molding or brazing. Accordingly, the plate type heat exchanger is similar to the printed circuit heat exchanger in view of an application field, but is more widely used under a low-pressure condition. Heat transfer efficiency of the plate type heat exchanger is lower than that of the printed circuit heat exchanger but higher than that of the shell and tube type heat exchanger. Also, the plate type heat exchanger is manufactured through more simplified processes than the printed circuit heat exchanger.

The plate type heat exchanger disclosed herein, unless otherwise specified, is referred to as a heat exchanger when a difference is present in a method of manufacturing or bonding plates as well as the general plate type heat exchanger and the printed circuit heat exchanger.

Meanwhile, thermoelectric phenomena involving a thermoelectric element or thermoelectric power generation disclosed herein include a Seebeck effect (1822), Peltier effect (1834), Thomson effect (1854) and the like. The Seebeck effect means a phenomenon in which electromotive force (electric power) is generated to cause a passage of the current when temperature difference exists between two contacts of a closed circuit formed by connecting two kinds of metals or semiconductors. This current is referred to as a thermoelectric current, and the electric power generated between metal lines is referred to as thermoelectromotive force (thermoelectric power). The magnitude of the thermoelectric current depends on the kinds of the paired metals and the temperature differences between the two contacts, and additionally is dependent on electric resistance of the metal lines. The Peltier effect, unlike the Seebeck effect, is a phenomenon in which the temperature difference is generated due to production and absorption of heat at two junctions when a current is applied. The Thomson effect is a phenomenon in which the Seebeck effect and the Peltier effect have correlation. A thermoelectric generator which is an energy conversion device of directly converting heat energy into electric energy can generate electricity (electric power) for use without a mechanical driving component when a heat source exists. The thermoelectric generation uses the Seebeck effect, in which electromotive force is generated due to a temperature difference between both ends of two different metals connected to each other, to cause the passage of the current by the production/absorption of heat of a thermoelectric module. The thermoelectric generation technology is a practical technology capable of reusing even low grade waste heat as electricity by converting even heat near room temperature into electricity, and is applied to an ocean thermal energy conversion (OTEC) power generation, a solar energy generation and the like. Accordingly, a usage range of the thermoelectric generation gradually becomes wide.

The passive safety system for the nuclear power plant uses natural force that is generated by natural phenomena such as gravity force, gas pressure, density difference and the like, and thereby constructing the system is very limited. The passive safety system is driven using natural force by operating a safety system using power of a small battery required for opening a valve or the like when an emergency AC power source or an external power supply is not present. Therefore, the passive safety system is very excellent in view of safety. However, economical efficiency thereof is highly likely to be decreased due to a very limited design configuration option and very low driving force. For the heat exchanger, for example, a circulation flow of internal or external fluid of the heat exchanger depends on a natural circulation typically caused by a density difference. Accordingly, a heat exchange performance is decreased and thereby a size of the heat exchanger increases.

Therefore, a configuration of a system having a compact size and providing higher efficiency than efficiency obtained when using the related art heat exchanger, by supplying circulating force to fluid using electricity produced by thermoelectric generation in a manner of additionally employing a thermoelectric element in a heat exchanger, which can be used in a passive safety system of a nuclear power plant.

DISCLOSURE OF THE INVENTION

An aspect of the detailed description is to provide a passive safety system having a compact heat exchanger with high efficiency, using electricity produced by a thermoelectric power generation, and a nuclear power plant having the same.

Another aspect of the detailed description is to provide a passive safety system with more improved economical efficiency and safety by generating electricity from waste heat generated upon an occurrence of an accident through a thermoelectric element and utilizing the generated electricity for a safety system, and a nuclear power plant having the same.

To achieve these and other advantages and in accordance with the purpose of the present invention, as embodied and broadly described herein, there is provided a passive safety system, including a passive containment cooling system, a heat exchanger formed at a space inside or outside a hermetic containment, allowing heat exchange of internal atmosphere of the containment introduced therein, such that pressure or temperature of the internal atmosphere is reduced, when an accident occurs in a reactor coolant system or secondary system disposed within the containment, a thermoelectric element disposed within the heat exchanger and configured to produce electricity due to a temperature difference between the internal atmosphere and a cooling fluid, heat-exchanged with the internal atmosphere, when the cooling fluid performs the heat exchange with the internal atmosphere within the heat exchanger, and a fan unit or a pump unit connected to the thermoelectric element via an electricity path to receive the electricity produced from the thermoelectric element and configured to form a flow of fluid inside or outside the containment.

In accordance with one embodiment disclosed herein, the fan unit may be configured to increase a flow rate of the internal atmosphere or cooling fluid passing through the heat exchanger, to facilitate the heat exchange between the internal atmosphere and the cooling fluid within the heat exchanger.

Here, the heat exchanger may be arranged within the containment such that the internal atmosphere is introduced directly into the heat exchanger.

Also, the passive safety system may further include an emergency cooling fluid storage section configured to store an emergency cooling fluid introduced into the heat exchanger for the heat exchange with the internal atmosphere upon an occurrence of an accident, and cooling fluid flow paths configured to connect the emergency cooling fluid storage section to the heat exchanger such that the emergency cooling fluid is introduced into the heat exchanger.

The fan unit may be configured to blow the internal atmosphere toward the heat exchanger, to facilitate steam discharged from the reactor coolant system or secondary system to be introduced into the heat exchanger from a portion above the heat exchanger.

The fan unit may be disposed outside the containment and configured to introduce an external cooling fluid of the containment into the heat exchanger through an external cooling fluid flow path connecting the heat exchanger to the outside of the containment.

In accordance with another embodiment disclosed herein, the heat exchanger may be arranged outside the containment and include an internal atmosphere introduction flow path formed through the containment to connect the inside of the containment to the heat exchanger, such that the internal atmosphere is introduced into the heat exchanger.

The heat exchanger may include a duct unit having at least part of a channel thereof narrowed toward an upper portion of the heat exchanger, such that the external cooling fluid is introduced into a lower portion of the heat exchanger and discharged out of the upper portion of the heat exchanger, and the fan unit may be located inside the containment and arranged on the internal atmosphere introduction flow path to introduce the internal atmosphere into the heat exchanger.

The heat exchanger may include a duct unit having at least part of a flow channel thereof narrowed toward an upper portion of the heat exchanger, such that the external cooling fluid is introduced into a lower portion of the heat exchanger and discharged out of the upper portion of the heat exchanger, and the fan unit may be located in an upper or lower portion of the duct unit and configured to allow the external cooling fluid of the containment within the duct unit to be discharged through an upper portion of the duct unit such that the external cooling fluid flows much faster in the duct unit.

Here, the passive safety system may further include an emergency cooling fluid storage section configured to store an emergency cooling fluid introduced into the heat exchanger for the heat exchange with the internal atmosphere upon an occurrence of an accident, and a circulation flow path configured to circulate the emergency cooling fluid through the heat exchanger. The fan unit may be located inside the containment and arranged on the internal atmosphere introduction flow path to introduce the internal atmosphere into the heat exchanger.

In accordance with another embodiment of the present invention, a passive safety system may include a feedwater flow path forming a flow channel for injecting fluid into a steam generator provided within the containment, a steam flow path along which steam discharged from the steam generator flows toward a turbine system, a heat exchanger, a thermoelectric element disposed in the heat exchanger and configured to produce electricity due to a temperature difference between the steam and an external cooling fluid of the containment, heat-exchanged with the steam, while the external cooling fluid performs the heat exchange with the steam within the heat exchanger, a duct unit having at least part of a flow channel thereof narrowed toward an upper portion of the heat exchanger such that the external cooling fluid of the containment is introduced into a lower portion of the heat exchanger and discharged out of the upper portion of the heat exchanger, and a fan unit. The heat exchanger may be disposed outside the containment to reduce internal pressure or temperature of a reactor coolant system when an accident occurs in the reactor coolant system or secondary system disposed within the hermetic containment. The heat exchanger may receive the steam supplied through the steam flow path and discharge condensate, which has been passed through the heat exchanger, through the feedwater flow path. The fan unit may be arranged in an upper or lower portion of the duct unit, and configured to allow the external cooling fluid of the containment within the duct unit to be discharged through an upper portion of the duct unit such that the external cooling fluid flows much faster in the duct unit.

The electricity path may be provided with a charging unit disposed on the electricity path to store the electricity produced from the thermoelectric element so as to supply the electricity to the fan unit.

Here, the heat exchanger may be configured as a water-cooling or air-cooling type. The pump unit may facilitate a heat exchange between the internal atmosphere and an emergency cooling fluid within the heat exchanger or a flow of a cooling fluid for reducing temperature of the internal atmosphere. The electricity produced from the thermoelectric element arranged in the heat exchanger may allow the cooling fluid to be sprayed into the containment by the pump unit or allows cooling water to be injected into a safety system by the pump unit.

In accordance with another embodiment disclosed herein, the passive safety system may further include an emergency cooling fluid storage section configured to store the emergency cooling fluid introduced into the heat exchanger for the heat exchange with the internal atmosphere, and a cooling fluid flow path configured to connect the emergency cooling fluid storage section to the heat exchanger such that the emergency cooling fluid is introduced into the heat exchanger.

The pump unit may be disposed on the cooling fluid flow path such that the emergency cooling fluid is efficiently introduced into the heat exchanger, and allow the emergency cooling fluid to be supplied from the emergency cooling fluid storage section into the heat exchanger.

In accordance with another embodiment disclosed herein, the passive safety system may further include a cooling fluid storage section disposed adjacent to the containment to store therein the cooling fluid for reducing the internal temperature of the containment, and a spray device disposed at an upper side within the containment and configured to spray the cooling fluid supplied from the cooling fluid storage section into the containment when an accident occurs within the containment. The pump unit may be disposed on a fluid supply flow path for connecting the cooling fluid storage section and the spray device to each other, to supply the cooling fluid into the spray device.

In accordance with another embodiment disclosed herein, the passive safety system may further include a cooling fluid storage section disposed adjacent to the containment to store therein the cooling fluid for reducing the internal temperature of the containment, and a safety injection system configured to inject fluid into the reactor coolant system when an accident occurs in the reactor coolant system. The pump unit may be disposed on a fluid supply flow path for connecting the safety injection system to the cooling fluid storage section to supply the cooling fluid to the safety injection system such that the safety injection system injects the cooling fluid into the reactor coolant system.

In accordance with another embodiment disclosed herein, the passive safety system may further include a cooling fluid storage section disposed adjacent to the containment to store therein the cooling fluid for reducing the internal temperature of the containment. The pump unit may be configured to introduce the cooling fluid stored in the cooling fluid storage section into the emergency cooling fluid storage section when a water level of the emergency cooling fluid storage section is decreased.

To achieve these and other advantages and in accordance with the purpose of the present invention, as embodied and broadly described herein, there is provided a nuclear power plant, including a reactor coolant system having a core of a reactor, a steam generator, a containment surrounding the reactor coolant system to prevent a leakage of a radioactive material upon an occurrence of an accident, and a passive safety system configured to prevent an increase in internal pressure of the containment due to steam discharged from the reactor coolant system or secondary system. The passive safety system may include a heat exchanger formed at a space inside or outside a hermetic containment, and allowing heat exchange of internal atmosphere of the containment introduced therein, such that pressure or temperature of the internal atmosphere is reduced, when an accident occurs in a reactor coolant system or secondary system disposed within the containment, a thermoelectric element disposed within the heat exchanger and configured to produce electricity due to a temperature difference between the internal atmosphere and a cooling fluid, heat-exchanged with the internal atmosphere, when the cooling fluid performs the heat exchange with the internal atmosphere within the heat exchanger, and a fan unit connected to the thermoelectric element through an electricity path to receive the electricity produced from the thermoelectric element, and configured to increase a flow rate of the internal atmosphere or cooling fluid passed through the heat exchanger to facilitate the heat exchange between the internal atmosphere and the cooling fluid within the heat exchanger.

To achieve these and other advantages and in accordance with the purpose of the present invention, as embodied and broadly described herein, there is provided a nuclear power plant, including a reactor coolant system having a core of a reactor, a steam generator, a containment surrounding the reactor coolant system to prevent a leakage of a radioactive material upon an occurrence of an accident, and a passive safety system configured to prevent an increase in internal pressure of the containment due to steam discharged from the reactor coolant system or secondary system. The passive safety system may include a heat exchanger formed at a space inside or outside a hermetic containment, and allowing heat exchange of internal atmosphere of the containment introduced therein, such that pressure or temperature of the internal atmosphere is reduced, when an accident occurs in a reactor coolant system or secondary system disposed within the containment, a thermoelectric element disposed within the heat exchanger to produce electricity due to a temperature difference between the internal atmosphere and an emergency cooling fluid, heat-exchanged with the internal atmosphere, while the emergency cooling fluid performs the heat exchange with the internal atmosphere within the heat exchanger upon an occurrence of an accident, an emergency cooling fluid storage section configured to store therein the emergency cooling fluid introduced into the heat exchanger for the heat exchange with the internal atmosphere, a cooling fluid flow path connecting the emergency cooling fluid storage section to the heat exchanger such that the emergency cooling fluid is introduced into the heat exchanger, and a pump unit connected to the thermoelectric element through an electricity path to receive the electricity produced from the thermoelectric element, and configured to facilitate the heat exchange between the internal atmosphere and emergency cooling fluid within the heat exchanger or a flow of a cooling fluid for reducing temperature of the internal atmosphere.

ADVANTAGEOUS EFFECT

According to the present invention with the configuration, a passive safety system which provides higher efficiency of a heat exchanger than that of the related art heat exchanger and has a more compact size, by providing circulating force to fluid (atmosphere or cooling fluid) using electricity produced by thermoelectric generation upon an occurrence of an accident, in a manner of further employing a thermoelectric element in the heat exchanger.

According to the present invention, a thermoelectric element can be coupled to a heat exchanger (specifically, plate type heat exchanger) so as to provide circulating force to a flow path with a low heat transfer rate using electricity produced by thermoelectric generation upon an occurrence of an accident, thereby enhancing efficiency of the heat exchanger and reduce a capacity of the heat exchanger.

According to the present invention, electricity produced through thermoelectric generation upon an occurrence of an accident can be used as fluid circulating force of a heat exchanger, thereby alleviating a great disadvantage of a plate type heat exchanger which exhibits very high heat transfer efficiency but great flow resistance.

According to the present invention, when electricity produced in a heat exchanger of a passive safety system disclosed herein is used for facilities for supplying cooling water of a passive containment spray system, a passive residual heat removal system or a passive safety injection system, the passive safety system can be more easily implemented, thereby enhancing safety and economical efficiency.

MODES FOR CARRYING OUT THE PREFERRED EMBODIMENTS

Figure 1A:
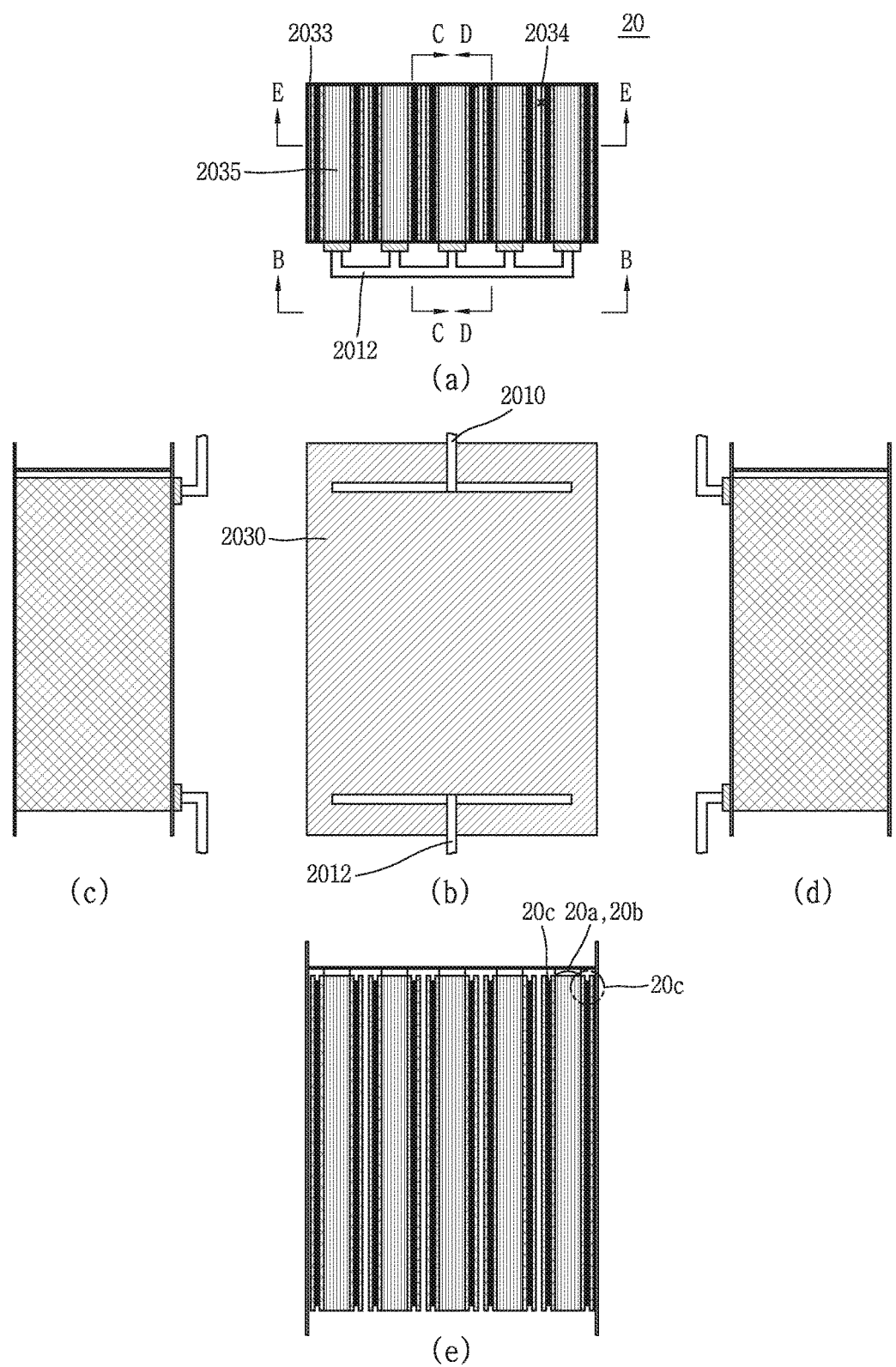
FIGS. 1A to 1C are conceptual views illustrating a detailed structure of a heat exchanger in accordance with one embodiment of the present invention.

Hereinafter, description will be given in more detail of a passive safety system and a nuclear power plant having the same according to the present invention, with reference to the accompanying drawings. This specification employs like/similar reference numerals for like/similar components irrespective of different embodiments, so they all will be understood by the first description. The expression in the singular form in this specification will cover the expression in the plural form unless otherwise indicated obviously from the context.

The present invention proposes various methods for improving economical efficiency or enhancing safety in a manner of supplying cooling water to a passive safety system, by constructing the system having a more compact size and providing higher efficiency than that obtained when using the related art heat exchanger, in a manner of additionally employing a thermoelectric element in a heat exchanger, which is capable of being used in a passive safety system of a nuclear power plant, to supply circulating force to fluid of the passive safety system using electricity produced through thermoelectric generation upon an occurrence of an accident.

Specifically, a plate type heat exchanger-thermoelectric element coupling method, which is selectively proposed in the present invention, has a structure of facilitating coupling between the plate type heat exchanger and the thermoelectric element, and thus can be employed as a very useful configuration option, in view of generating electricity using passive energy such as residual heat generated inside a nuclear power plant, even without an external action, upon an occurrence of an accident.

However, coupling methods of the heat exchanger and the thermoelectric element can be variously extended according to various types of a safety system heat exchanger, and thus the present invention may not be specifically limited to the plate type heat exchanger.

A heat exchanger allows a heat transfer between two fluids. Therefore, when the two fluids are not the same type and do not have the same flowing condition, the two fluids have different heat transfer coefficients from each other. Accordingly, one of the two fluids having a small heat transfer coefficient becomes a factor deciding a size of the heat exchanger, thereby increasing the size of the heat exchanger. The present invention has provided a configuration option capable of improving economical efficiency by reducing the size of the heat exchanger or enhancing safety by stably providing a flow, by way of increasing a heat transfer rate, in a manner of inducing a forced flow in a flow path, in which fluid with a small heat transfer coefficient flows and a circulation flow is difficult to be generated, using a fan or pump by supplying electricity produced in the heat exchanger using waste heat generated upon an occurrence of an accident. Meanwhile, when the heat exchanger is reduced in size, problems of an arrangement inside and outside of a containment and a structure load can be remarkably alleviated.

In order to apply a passive containment spray system, which is driven by gravity force, to a nuclear power plant to reduce internal pressure of the containment upon an occurrence of an accident, a very great quantity of water should be stored in an upper portion of the containment during a normal operation of the nuclear power plant. However, a large space is needed to store such a lot of water in the upper portion of the containment and a great load is applied to a structure due to the stored water. Therefore, it is realistically very difficult to install a water tank useable for a long term of time. Also, the similar issue is brought about in a passive residual heat removal system using an emergency cooling fluid storage section or a passive safety injection system when a method of using condensate (condensate water) proposed in the present invention is not applied.

As aforementioned, upon applying the technology according to the present invention, electricity produced in the heat exchanger-thermoelectric element coupling manner of the passive safety system upon an occurrence of an accident can be used for improving efficiency of the heat exchanger, supplying cooling water of the passive safety system or ensuring a cooling water supply unit, which can contribute to improving safety and economical efficiency of a nuclear power plant.

Figure 1B:
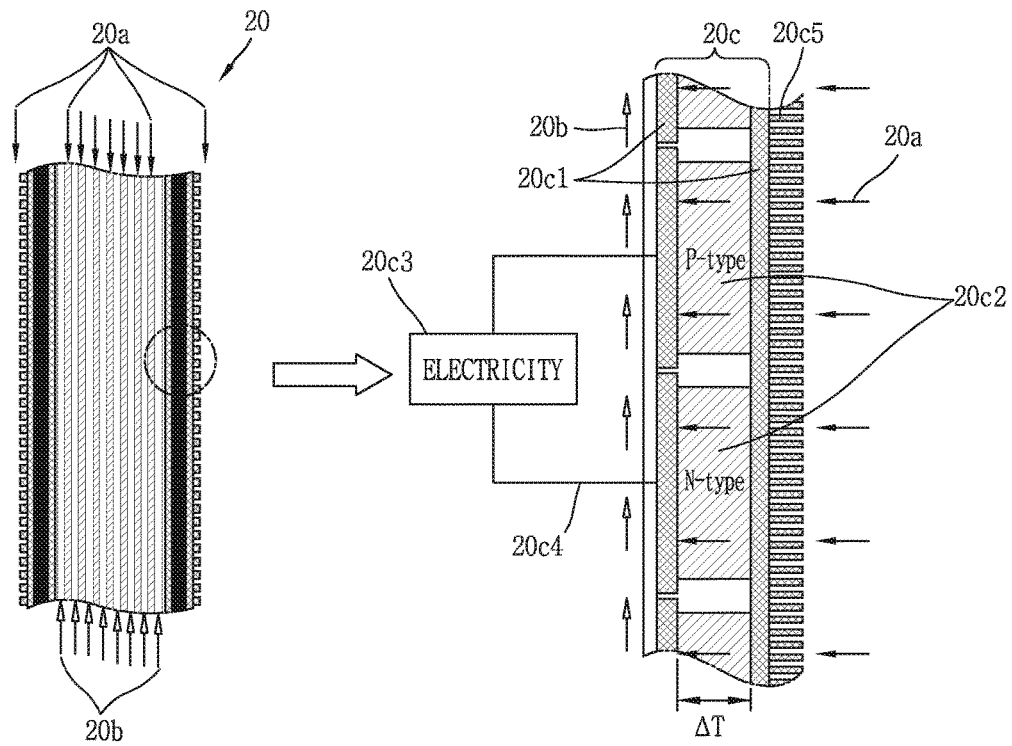
Figure 1C:
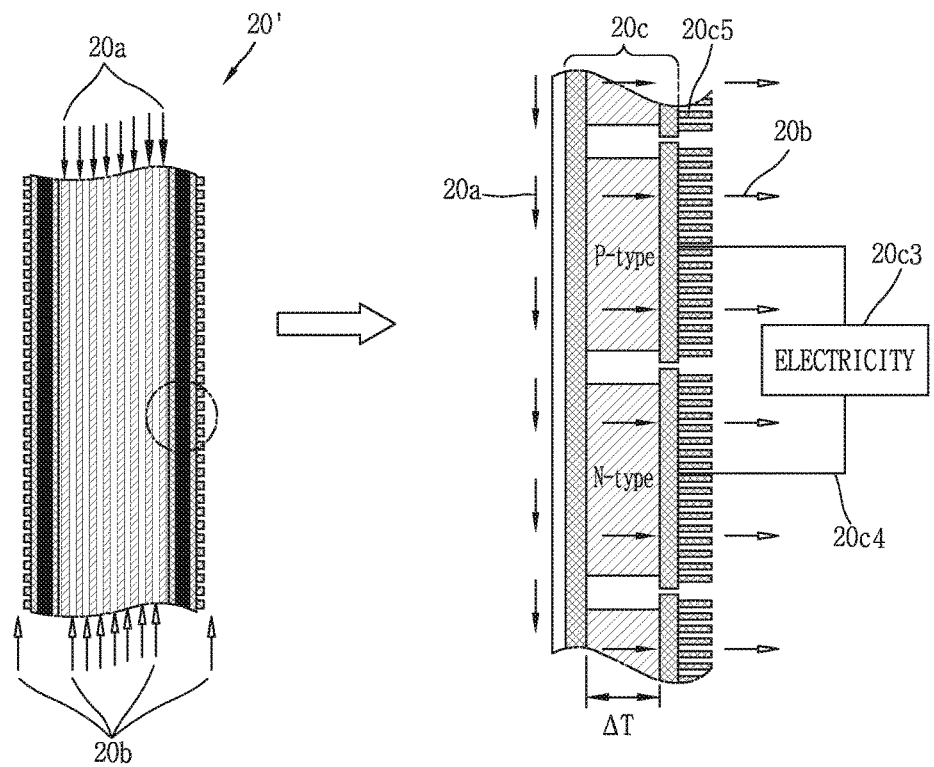

FIGS. 1A to 1C are conceptual views illustrating a detailed structure of a heat exchanger 20 in accordance with one embodiment of the present invention.

(A) is a top view of a plate type heat exchanger 20, (b) is a front view, (c) is a sectional view taken along the line C-C of (a), (d) is a sectional view taken along the line D-D of (a) and (e) is a sectional view taken along the line E-E of (a). Referring to those drawings, cooling fluid and atmosphere inside a containment are introduced into an inlet/outlet pipe 2010 to be distributed into a plurality of heat transfer channels 2035 (plate channels). The cooling fluid and the atmosphere inside the containment distributed in the plate channels 2035 flow up or down along the heat exchanger 20 and then are discharged through an inlet/outlet pipe 2012 disposed at an opposite side.

Here, to distribute the cooling fluid into the plurality of plate channels 2035, headers may also be provided at upper and lower portions of the heat exchanger 20, respectively.

The heat exchanger 20 may be provided in plurality. The plurality of heat exchangers 20 may be closely adhered on one another. Also, each heat exchanger 20 may be provided with thermoelectric elements 20c (see (e)) arranged at both sides of each channel 2035. The thermoelectric element 20c will be described in detail with reference to FIG. 1B.

An inlet header serves to distribute a flow rate of fluid supplied to the heat exchanger 20 into an inlet channel of the heat exchanger 20. An outlet header serves to collect a flow of fluid discharged into an outlet channel of the heat exchanger 20.

In order to reduce temperature of atmosphere introduced into the plate channels 2035, cooling pins 2033 may surround the plate channels 2035. Or, unlike the structure illustrated in the drawing, a channel, which has a different shape from that of a channel adjacent to an arranged position of the cooling pins 2033 may also be formed (high temperature fluid flows along the channel when low temperature fluid flows along the adjacent channel, and low temperature fluid flows along the channel when high temperature fluid flows along the adjacent channel).

As such, temperature and pressure of atmosphere inside the containment can fast be controlled by configuring the heat exchangers 20 by stacking the plurality of plate channels 2035 each forming a fine channel and combining a plurality of single heat exchangers 20 each surrounded by the cooling pins 2033. In addition, the plurality of plate channels 2035 may produce electricity using electric power, which is generated due to a temperature difference between the adjacent channels through adjacently-arranged thermoelectric elements 20c.

FIGS. 1B and 1C are conceptual views illustrating channels formed in the heat exchanger 20 and thermoelectric elements arranged adjacent to the channels.

First, referring to the left drawing of FIG. 1B, a high temperature channel part 20a along which high temperature fluid flows is shown at an upper portion of one heat exchanger 20, and a low temperature channel part 20b along which low temperature fluid flows is shown at a lower portion of the one heat exchanger 20.

The right drawing of FIG. 1B illustrates a detailed view of the thermoelectric element 20c that is arranged adjacent to the channel parts to generate electric power due to a temperature difference. The low temperature channel part 20b along which the low temperature fluid flows is arranged at the left of the thermoelectric element 20c, and the high temperature channel part 20a along which the high temperature fluid flows is arranged at the right of the thermoelectric element 20c. The thermoelectric element 20c is interposed between the low temperature channel part 20b and the high temperature channel part 20a.

The thermoelectric element 20c includes thermoelectric plates 20c1, semiconductors 20c2 generating the electric power, a power generating portion 20c3 connected to the semiconductors 20c2 to generate electricity, and an electricity path 20c4 connecting the semiconductors 20c2 and the power generating portion 20c3.

The thermoelectric plates 20c1 come in contact with the high temperature channel part or the low temperature channel part, and the semiconductors 20c2 are interposed between the thermoelectric plates 20c1 arranged at both sides.

The semiconductors 20c2 may be classified into N-type semiconductors and P-type semiconductors, which are alternately arranged in a spaced manner.

The power generating portion 20c3 is connected to the N-type and P-type semiconductors by the electricity path 20c4, and electricity is produced in the power generating portion 20c3. The power generating portion 20c3 is formed at a different position from the positions of the channel parts 20a and 20b so as not to affect the channels. Also, the power generating portion 20c3 may be connected to such several semiconductors so as to produce a greater quantity of electricity.

As illustrated, cooling pins 20c5 may be formed at the side of the high temperature channel part 20a. The cooling pins 20c5 may be formed to be brought into contact with fluid with an opposite attribute to fluid flowing in the adjacent channel 20b (i.e., to be brought into contact with low temperature fluid when high temperature fluid flows along the adjacent channel and with the high temperature fluid when the low temperature fluid flows along the adjacent channel).

Next, referring to FIG. 1C, the high temperature channel part 20a along which the high temperature fluid flows is shown at the upper portion and the low temperature channel part 20b along which the low temperature fluid flows is shown at the lower portion. Comparing with FIG. 1B, the configurations illustrated in FIG. 1B and FIG. 1C are the same as each other in that the high temperature channel part 20a and the low temperature channel part 20b are alternately formed, but different from each other in the aspect of the formed positions of the channel parts. Thus, the configurations may be selectively specified during a process of fabricating the heat exchanger 20, if necessary.

Referring to the right drawing of FIG. 1C, the power generating portion 20c3 that is connected to the N-type semiconductor and the P-type semiconductor to generate electricity is also shown. Besides, different methods of configuring the thermoelectric element can be employed, and thus the present invention may not be specifically limited to the illustrated method of configuring the thermoelectric element. Description of other components is similar/like to the description of FIG. 1B, and thus will be omitted for clarity of description.

Figure 2:
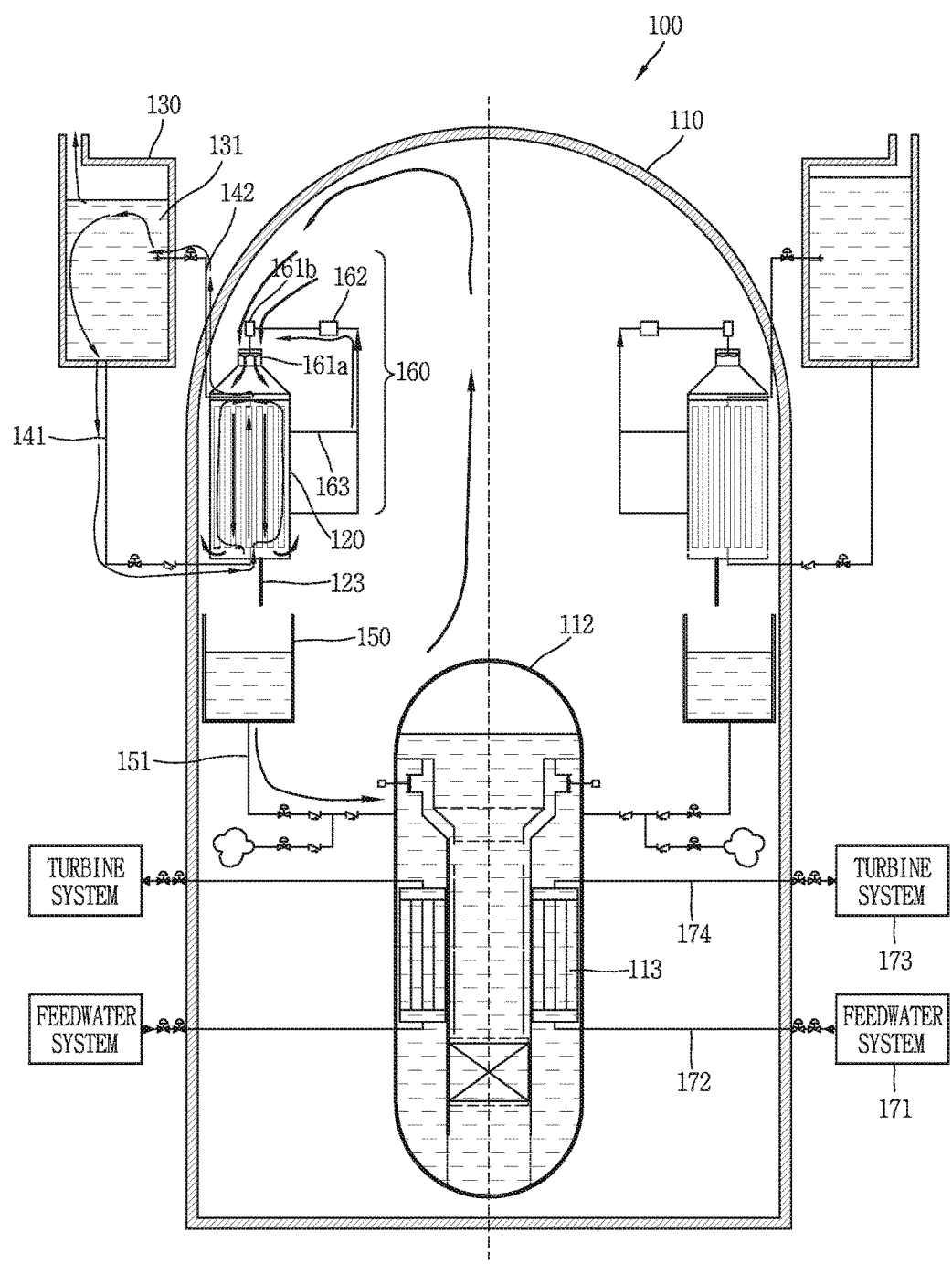
FIG. 2 is a conceptual view illustrating a passive safety system and a nuclear power plant having the same in accordance with one embodiment of the present invention.

FIG. 2 is a conceptual view illustrating a passive safety system and a nuclear power plant having the same in accordance with one embodiment of the present invention.

As illustrated in FIG. 2, a passive safety system, such as a passive containment cooling system, in accordance with one embodiment of the present invention includes a heat exchanger 120, a thermoelectric element 20c (see FIGS. 1B and 1C), and a fan unit 161a.

The heat exchanger 120 is provided at an inner space of a hermetic containment 110, and configured to carry out a heat exchange of internal atmosphere of the containment 110 introduced therein so as to lower pressure or temperature of the atmosphere when an accident occurs in a reactor coolant system 112 or a secondary system arranged inside the hermetic containment 110. On the other hand, the heat exchanger 120 may selectively be arranged outside the containment 110, other than inside the containment 110.

The thermoelectric element is arranged in the heat exchanger 120. As aforementioned, the thermoelectric element is arranged adjacent to the plate type heat exchanger 120. Also, the thermoelectric element produces electricity due to a temperature difference between the atmosphere and a cooling fluid 131 when the cooling fluid 131 and the atmosphere perform the heat exchange within the heat exchanger 120.

That is, when an accident, such as an increase in temperature or pressure of the atmosphere inside the containment 110, occurs, the heat exchange between the atmosphere inside the containment 110 and the cooling fluid 131 is started in the heat exchanger 120. In this instance, the thermoelectric element arranged in the heat exchanger 120 generates electric power due to a temperature difference between the cooling fluid 131 and the atmosphere inside the containment 110. The generated electric power can be used as driving force for driving other components, which are provided for enhancing efficiency of the heat exchange or reducing the temperature or pressure of the atmosphere inside the containment 110, or driving force for operating other safety systems.

The fan unit 161a is connected to the electricity path 163 such that the electricity produced from the thermoelectric element is supplied to the fan unit 161a. The fan unit 161a may be configured to increase a flow rate of the atmosphere inside the containment 110 or the cooling fluid outside the containment 110, which passes through the heat exchanger 120, so as to increase the heat transfer between the atmosphere and the cooling fluid 131 within the heat exchanger 120.

In this embodiment, the heat exchanger 120 may be arranged inside the containment 110 such that the atmosphere inside the containment 110 is introduced directly into the heat exchanger 120.

Also, the passive safety system according to this embodiment may further include an emergency cooling fluid storage section 130 and cooling fluid flow paths 141 and 142.

The emergency cooling fluid storage section 130 is configured to store therein an emergency cooling fluid 131 which is introduced into the heat exchanger 120 for heat exchange with the atmosphere upon an occurrence of an accident.

The cooling fluid flow paths 141 connect the emergency cooling fluid storage section 130 and the heat exchanger 120 to each other, such that the emergency cooling fluid 131 is introduced into the heat exchanger 120.

Also, the fan unit 161a may be arranged above the heat exchanger 120 and blow the atmosphere inside the containment 110 into the heat exchanger 120, such that steam discharged from the reactor coolant system 112 or secondary system can be easily introduced into the heat exchanger 120 from a portion above the heat exchanger 120. That is, the fan unit 161a is disposed above the heat exchanger 120 and blows the atmosphere inside the containment 110 from the portion above the heat exchanger 120 toward the heat exchanger 120 when electric power is supplied. This is for increasing circulation efficiency of the atmosphere inside the containment 110 so as to enhance overall efficiency of the heat exchange carried out within the heat exchanger 120 because a heat exchange capability of the atmosphere inside the containment 110 is relatively lower than that of the emergency cooling fluid 131.

Also, the heat exchanger 120 may further include an electricity path 163. The electricity path 163 is an electric line along which a current flows, such that the electricity is supplied from the thermoelectric element arranged in the heat exchanger 120 to be used for other components outside the heat exchanger 120. In addition, the electricity path 163 may include a charging unit 162 that is arranged on the electricity path 163 to store the electricity generated from the thermoelectric element and supply the stored electricity to the fan unit 161a.

The charging unit 162 is disposed in a middle portion of the electricity path 163 along which the electricity generated from the thermoelectric element flows toward the fan unit 161a. When the electricity generated from the thermoelectric element is generated enough after supplying the fan unit 161a, the remaining electricity is stored in the charging unit 162. When the electricity generated from the thermoelectric element is less than electricity required for driving the fan unit 161a, a current sufficient for driving the fan unit 161a is supplied from the charging unit 162 to the fan unit 161a. Also, the charging unit 162 may be configured to drive the fan unit 161a at the beginning of an accident using the current stored therein before the accident, so as to allow a smooth operation of the heat exchanger 120 and thus mitigate the accident in an early stage. By the employment of the charging unit 162, the current can be sufficiently supplied in a stable state from the beginning of the heat exchange in the heat exchanger 120 to the long-term period of the heat exchange.

Also, a nuclear power plant 100 according to one embodiment of the present invention includes a reactor coolant system 112 having a core of a reactor, a steam generator 113, a containment 110 protecting the reactor coolant system 112 to prevent a leakage of a radioactive material upon an occurrence of an accident, and a passive safety system, such as a passive containment cooling system, for preventing an increase in internal pressure of the containment 110 due to steam discharged from the reactor coolant system 112 or a secondary system upon the occurrence of the accident. The passive safety system includes a heat exchanger 120 disposed at an inner space of the containment 110, and configured to carry out a heat exchange of internal atmosphere of the containment 110 introduced therein so as to decrease pressure or temperature of the atmosphere when an accident occurs in the reactor coolant system 112 or a secondary system arranged inside the hermetic containment 110, a thermoelectric element disposed in the heat exchanger 120 and configured to produce electricity using a temperature difference between the atmosphere and the cooling fluid 131 when the cooling fluid 131 performs the heat exchange with the atmosphere within the heat exchanger 120, and a fan unit 161a connected to the thermoelectric element via an electricity path 163 to receive the electricity produced from the thermoelectric element and configured to increase a flow rate of the atmosphere inside the containment 110, which passes through the heat exchanger 120, so as to increase the heat exchange between the atmosphere and the cooling fluid 131 within the heat exchanger 120.

A right figure of the drawing illustrates a normal operation state of the nuclear power plant, and a left figure of the drawing illustrates flows of various fluids and electricity upon an occurrence of an accident inside the containment 110.

Figure 3:
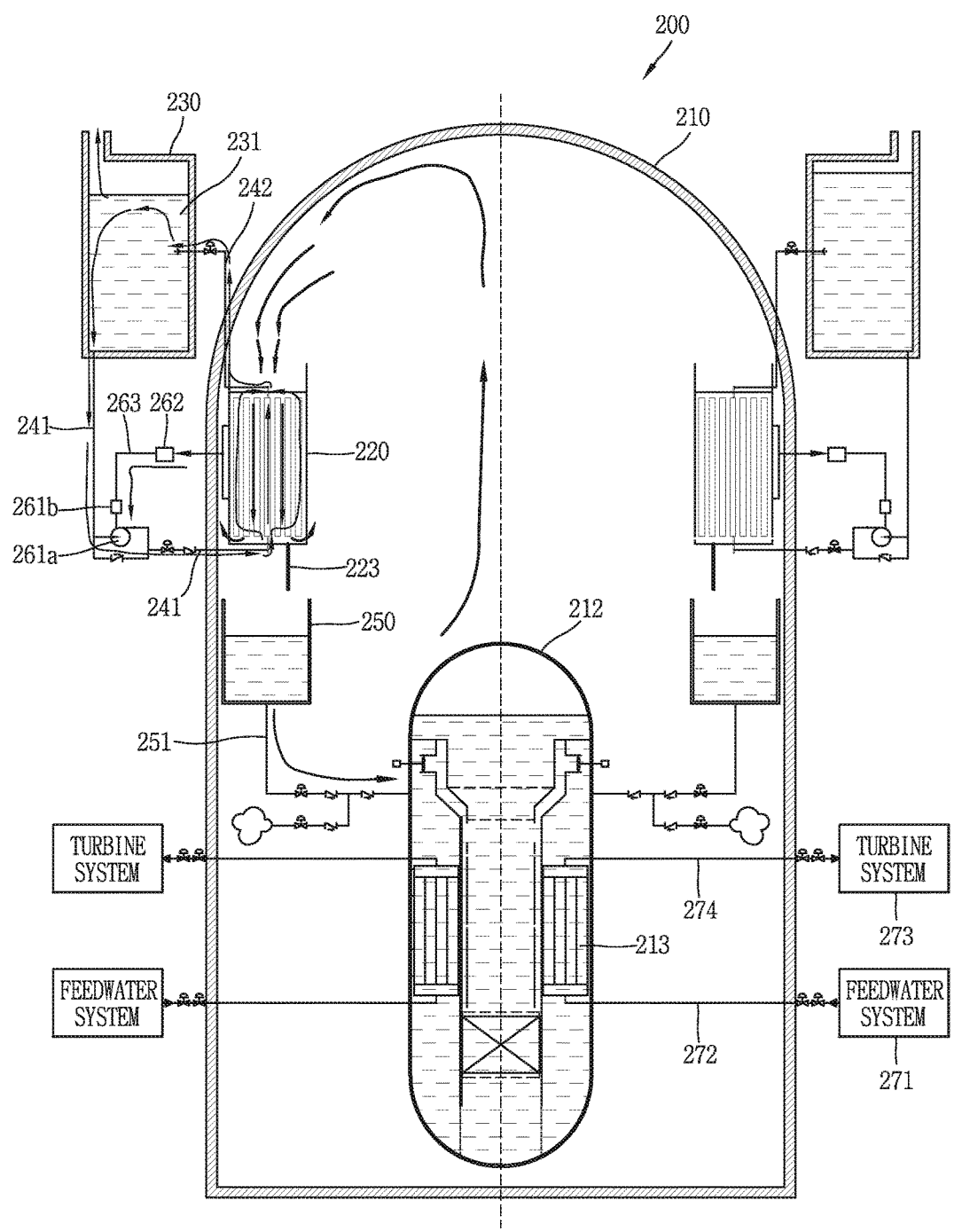
FIG. 3 is a conceptual view illustrating a passive safety system and a nuclear power plant having the same in accordance with another embodiment of the present invention.

FIG. 3 is a conceptual view illustrating a passive safety system and a nuclear power plant having the same in accordance with another embodiment of the present invention.

A passive safety system such as a passive containment cooling system according to this embodiment includes a heat exchanger 220, a thermoelectric element 20c (see FIG. 1B), an emergency cooling fluid storage section 230, cooling fluid flow paths 241 and 242 and a pump unit 261a. The heat exchanger 220, the thermoelectric element, the emergency cooling fluid storage section 230 and the cooling fluid flow paths 241 and 242 are similar/like to those illustrated in the foregoing embodiment, so description thereof will be omitted for clarity of explanation.

The pump unit 261a of this embodiment is connected to the thermoelectric element via the electricity path 263 to receive the electricity produced from the thermoelectric element, and increase the heat exchange between the atmosphere and the emergency cooling fluid within the heat exchanger 220 or a flow of fluid which can lower the temperature of the atmosphere.

The pump unit 261a is arranged on a cooling fluid flow path 241 as a flow channel along which the emergency cooling fluid 231 is introduced into the heat exchanger 220 from the emergency cooling fluid storage section 230. When the heat exchange is started in the heat exchanger 220, the electricity is supplied from the thermoelectric element disposed within the heat exchanger 220 to the pump unit 261a so as to drive the pump unit 261a such that the emergency cooling fluid 231 can be introduced at faster speed into the heat exchanger 220.

In response to the pump unit 261a being driven, the emergency cooling fluid 231 is supplied well into the heat exchanger 220, and thus heat transfer efficiency between the emergency cooling fluid 231 and the atmosphere inside the containment 210 within the heat exchanger 220 is enhanced. Therefore, the temperature and pressure of the atmosphere inside the containment 210 can fast be reduced.

The emergency cooling fluid supplied in the heat exchanger 220 is recirculated back into the emergency cooling fluid storage section 230 along the return cooling fluid flow path 242 that connects a top of the heat exchanger 220 to the emergency cooling fluid storage section 230 to allow the emergency cooling fluid to be returned into the emergency cooling fluid storage section 230. The returned emergency cooling fluid can be supplied again into the heat exchanger 220 by the pump unit 261*a*.

Also, a nuclear power plant 200 according to this embodiment includes the reactor coolant system 212 having a core of a reactor, a steam generator 213, the containment 210 protecting the reactor coolant system 212 to prevent a leakage of a radioactive material upon an occurrence of an accident, and a passive safety system, such as a passive containment cooling system, for preventing an increase in internal pressure of the containment 210 due to steam discharged from the reactor coolant system 212 or a secondary system. The passive safety system includes a heat exchanger 220 disposed at an inner space of the containment 210, and configured to carry out a heat exchange of internal atmosphere of the containment 210 introduced therein so as to decrease pressure or temperature of the atmosphere when an accident occurs in the reactor coolant system 212 or a secondary system arranged inside the hermetic containment 210, a thermoelectric element disposed in the heat exchanger 220 and configured to produce electricity using a temperature difference between the atmosphere and the emergency cooling fluid, which performs heat exchange with the atmosphere upon an occurrence of an accident, when the emergency cooling fluid 231 performs the heat exchange with the atmosphere within the heat exchanger 220, an emergency cooling fluid storage section 230 storing therein the emergency cooling fluid introduced into the heat exchanger 220 for the heat exchange with the atmosphere, cooling fluid flow paths 241 and 242 connecting the emergency cooling fluid storage section 230 and the heat exchanger 220 to each other, respectively, such that the emergency cooling fluid is introduced into the heat exchanger 220, and a pump unit 261*a* connected to the thermoelectric element via an electricity path 263 to receive the electricity produced from the thermoelectric element, and configured to increase the heat exchange between the atmosphere and the emergency cooling fluid within the heat exchanger 220 or the flow of fluid for reducing the temperature of the atmosphere.

Other components are similar/like to those of the foregoing embodiments, so description thereof will be omitted for clarity of explanation.

Figure 4:
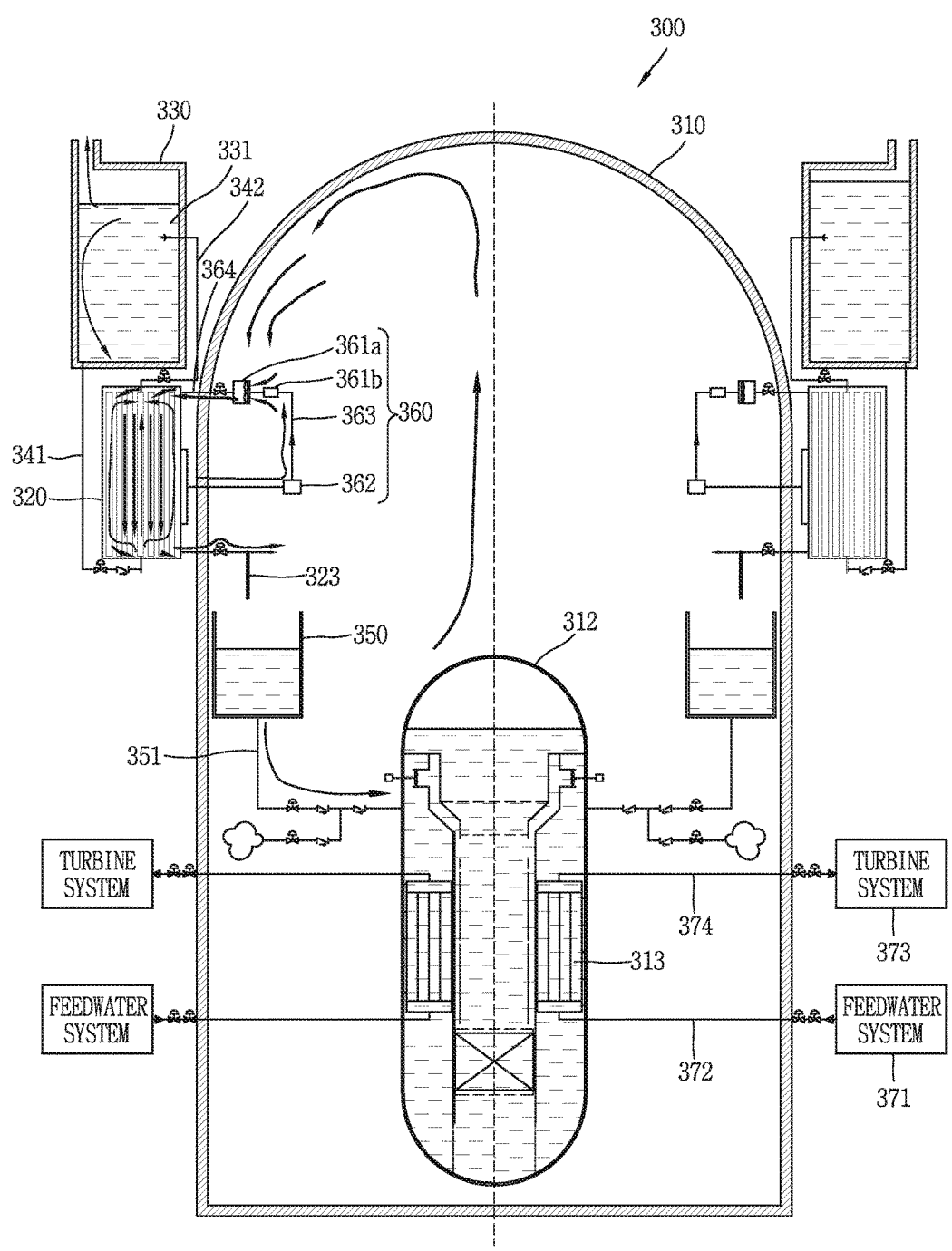
FIG. 4 is a conceptual view illustrating a passive safety system and a nuclear power plant having the same in accordance with another embodiment of the present invention.

FIG. 4 is a conceptual view illustrating a passive safety system and a nuclear power plant 300 having the same in accordance with another embodiment of the present invention.

A passive safety system such as a passive containment cooling system according to this embodiment may be provided with a heat exchanger 320 that is disposed outside a containment 310 and configured to allow an introduction therein of atmosphere inside the containment 310 such that the atmosphere can perform a heat exchange. A fan unit 361*a* is disposed within the containment 310 to allow the atmosphere inside the containment 310 to be introduced into the heat exchanger 320.

To this purpose, the passive safety system may include an internal atmosphere introduction flow path formed through the containment 310 to connect the inside of the containment 310 and the heat exchanger 320, such that the atmosphere inside the containment 310 can be introduced into the heat exchanger 320.

Upon an occurrence of an accident inside the containment 310, the atmosphere inside the containment 310 is introduced into the heat exchanger 320 via the internal atmosphere introduction flow path.

Also, the passive safety system may include an emergency cooling fluid storage section 330 storing therein an emergency cooling fluid 331 introduced into the heat exchanger 320 for the heat exchange with the atmosphere, and a circulation flow path 341, 342 along which the emergency cooling fluid circulates through the heat exchanger 320.

Also, a fan unit 361*a* may be arranged within the containment 310 and located on the internal atmosphere introduction flow path through which the atmosphere inside the containment 310 is introduced into the heat exchanger 320.

Hereinafter, an operation of the passive safety system according to this embodiment upon an occurrence of an accident will be described.

When an accident occurs in the containment 310, temperature and pressure of the atmosphere inside the containment 310 may increase. In this instance, the atmosphere inside the containment 310 may be introduced into the heat exchanger 320 along the internal atmosphere introduction flow path, and the emergency cooling fluid storage section 330 may introduce the emergency cooling fluid into the containment 310 based on a related signal upon the occurrence of the accident.

The atmosphere inside the containment 310 and the emergency cooling fluid perform the heat exchange within the heat exchanger 320, and electric power generated from the thermoelectric element arranged within the heat exchanger 320 is transferred to a charging unit 362 and the fan unit 361*a*.

The fan unit 361*a* is arranged on the internal atmosphere introduction flow path within the containment 310 to blow fluid in one direction. The fan unit 361*a* is also configured to blow the atmosphere inside the containment 310 into the heat exchanger 320.

Therefore, the atmosphere inside the containment 310 can be introduced well into the heat exchanger 320, and the heat exchange between the emergency cooling fluid and the atmosphere inside the containment 310 can be carried out more efficiently within the heat exchanger 320.

Other components are similar/like to the foregoing embodiments, so description thereof will be omitted for clarity of explanation.

Figure 5:
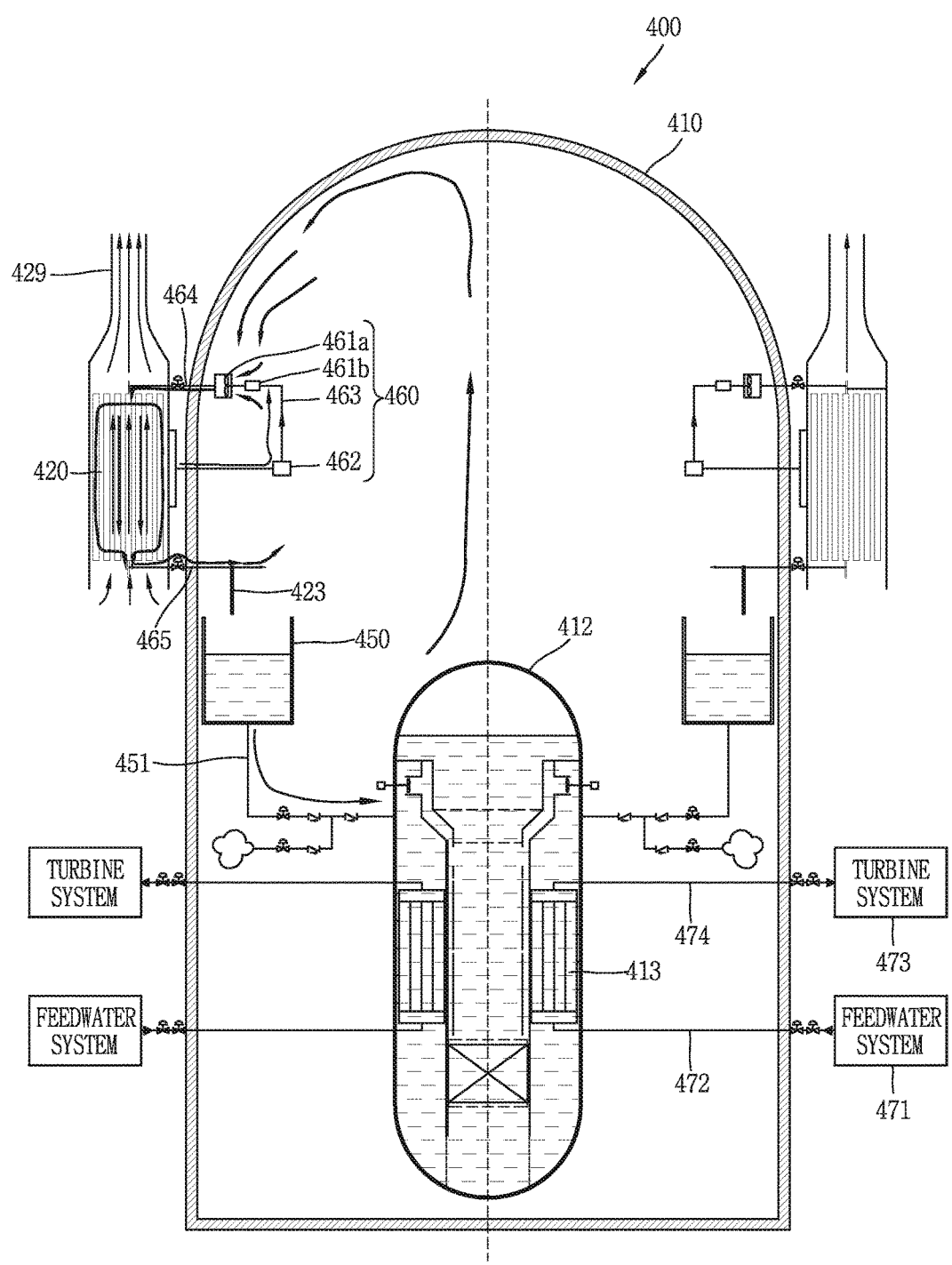
FIG. 5 is a conceptual view illustrating a passive safety system and a nuclear power plant having the same in accordance with another embodiment of the present invention.

FIG. 5 is a conceptual view illustrating a passive safety system and a nuclear power plant having the same in accordance with another embodiment of the present invention.

A passive safety system such as a passive containment cooling system according to one embodiment, similar to the embodiment of FIG. 4, may include a heat exchanger 420 arranged outside the containment 410, and an internal atmosphere introduction flow path 464 formed through a containment 410 and connecting the inside of the containment 410 and the heat exchanger 420, such that atmosphere inside the containment 410 can be introduced into the heat exchanger 420. However, unlike the embodiment of FIG. 4, an emergency cooling fluid storage section and a cooling fluid flow path may not be provided.

The passive safety system according to this embodiment may include a duct unit 329 having at least part of a flow channel thereof narrowed toward a portion above the heat exchanger 420, such that a cooling fluid outside the containment 410 is introduced into a lower portion of the heat exchanger 420 and flows through an upper portion of the heat exchanger 420.

A fan unit 461a may be located inside the containment 410, and disposed on the internal atmosphere introduction flow path 464 such that the atmosphere inside the containment 410 is introduced into the heat exchanger 420.

Hereinafter, an operation of the passive safety system according to this embodiment upon an occurrence of an accident will be described.

Upon an occurrence of an accident, the atmosphere inside the containment 410 is introduced into the heat exchanger 420 through the internal atmosphere introduction flow path 464. A relatively low temperature cooling fluid outside the containment 410 (i.e., cooling fluid existing outside the containment to cool the internal atmosphere of the containment through heat exchange, in other words, external cooling fluid of the containment) is introduced into the heat exchanger 420 through the lower portion of the duct unit 429 surrounding the heat exchanger 420. Inside the heat exchanger 420, the heat exchange is performed between the atmosphere inside the containment 410 and the cooling fluid outside the containment 410. And, the heat-exchanged cooling fluid outside the containment 410 is discharged out through the upper portion of the duct unit 429.

In this instance, as the upper portion of the duct unit 429 is formed such that the at least part of the flow channel is tapered, the cooling fluid outside the containment 410 is introduced well into the lower portion of the duct unit 429 according to a stack effect, and discharged out of the upper portion.

When the heat exchange is started within the heat exchanger 420, electric power is generated from the thermoelectric element 20c (see FIG. 1B) arranged in the heat exchanger 420 due to a temperature difference between the atmosphere inside the containment 410 and the cooling fluid outside the containment 410. The generated electric power is transferred to the fan unit 461a and the charging unit 462 along the electricity path. Therefore, the fan unit 461a is driven. The fan unit 461a, as aforementioned, allows the atmosphere inside the containment 461a to be blown into the heat exchanger 420, so as to enhance the heat transfer efficiency within the heat exchanger 420.

Other components are similar/like to those of the foregoing embodiments, so description will be given for clarity of explanation.

Figure 6:
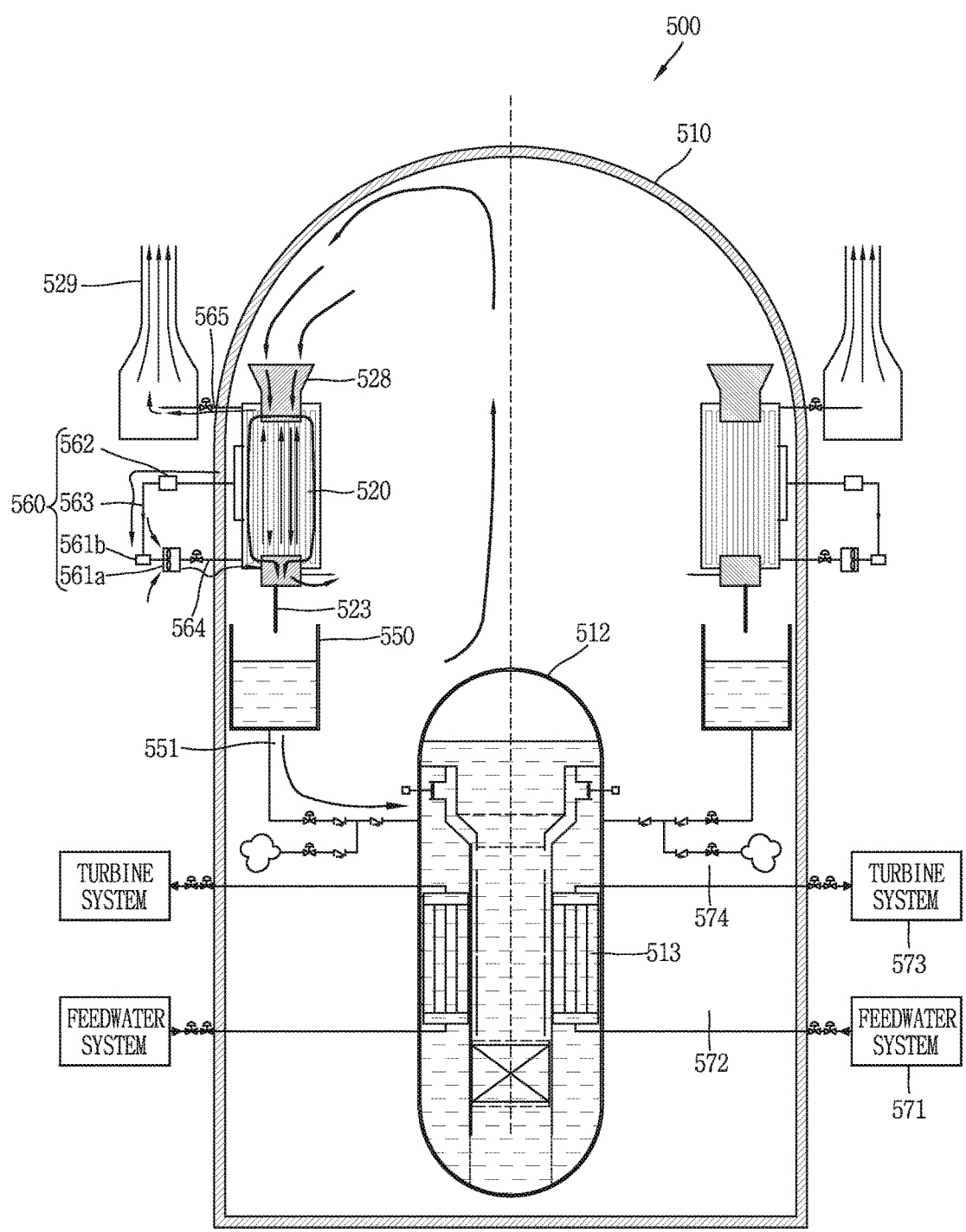
FIG. 6 is a conceptual view illustrating a passive safety system and a nuclear power plant having the same in accordance with another embodiment of the present invention.

FIG. 6 is a conceptual view illustrating a passive safety system and a nuclear power plant 500 having the same in accordance with another embodiment of the present invention.

A nuclear power plant 500 disclosed herein includes a passive safety system such as a passive containment cooling system according to this embodiment. The passive safety system may include a fan unit 561a, a duct unit 529 and an atmosphere guiding unit 528. A heat exchanger 520 may be disposed inside a containment 510 and the fan unit 561a may be disposed outside the containment 510 such that a cooling fluid outside the containment 510 can be introduced into the heat exchanger 520 through an external cooling fluid flow path 564 which connects the heat exchanger 520 and the outside of the containment 510 to each other.

In this embodiment, the cooling fluid which performs the heat exchange with the atmosphere inside the containment 510 (i.e., internal atmosphere of the containment) upon an occurrence of an accident corresponds to external atmosphere (i.e., external cooling fluid or external cooling atmosphere). The fan unit 561a blows the cooling fluid into a lower portion of the heat exchanger 520 arranged within the containment 510. The cooling fluid which has finished the heat exchange with the internal atmosphere of the containment 510 is discharged out of the containment 510 through an upper portion of the heat exchanger 520. The discharged cooling fluid is introduced into the duct unit 529 disposed outside the containment 510 and then discharged out of the duct unit 529.

The lower portion of the duct unit 529 may be blocked. As the lower portion of the duct unit 529 is blocked, the external cooling fluid discharged into the duct unit 529 may be more effectively discharged through the upper portion of the duct unit 529. Also, since the upper portion of the duct unit 529 is formed high and the lower portion thereof is blocked, an effect similar to a stack effect may be generated, and accordingly, an amount of the external cooling fluid introduced into the heat exchanger 520 through the lower portion of the heat exchanger 520 may further increase. However, the duct unit 529 may not be installed according to a design characteristic of the nuclear power plant.

Also, the passive safety system may further include the atmosphere guiding unit 528 which is formed at upper and lower sides of the heat exchanger 520 to allow the internal atmosphere of the containment 510 to be effectively introduced into or discharged out of the heat exchanger 520.

Hereinafter, an operation of the passive safety system according to this embodiment upon an occurrence of an accident will be described.

Upon an occurrence of an accident, high temperature or high pressure internal atmosphere of the containment 510 is introduced into the heat exchanger 520. And, external cooling fluid of the containment 510 is introduced into a lower portion of the heat exchanger 520. The introduced external cooling fluid and the internal atmosphere of the containment 510 perform the heat exchange within the heat exchanger 520. By virtue of the heat exchange, electric power is generated in the thermoelectric element 20c (see FIG. 1B) arranged within the heat exchanger 520. The generated electric power is supplied to the fan unit 561a, which is arranged on the external cooling fluid flow path 564 as a flow path along which the external cooling fluid of the containment 510 is introduced into the heat exchanger 520, and the charging unit 562. According to the generated electric power, the fan unit 561a is rotated by a motor 561b and the external cooling fluid of the containment 510 is introduced more well into the heat exchanger 520.

The external cooling fluid increases in temperature while performing the heat exchange with the internal atmosphere of the containment 510 through the heat exchanger 520. The temperature-increased external cooling fluid is then discharged out of the containment 510 through the upper portion of the heat exchanger 520. The external cooling fluid discharged out of the containment 510 is introduced into the duct unit 529 arranged outside the containment 510 and discharged out through the upper portion of the duct unit 529.

Other components are similar/like to those of the foregoing embodiments, so description will be given for clarity of explanation.

Figure 7A:
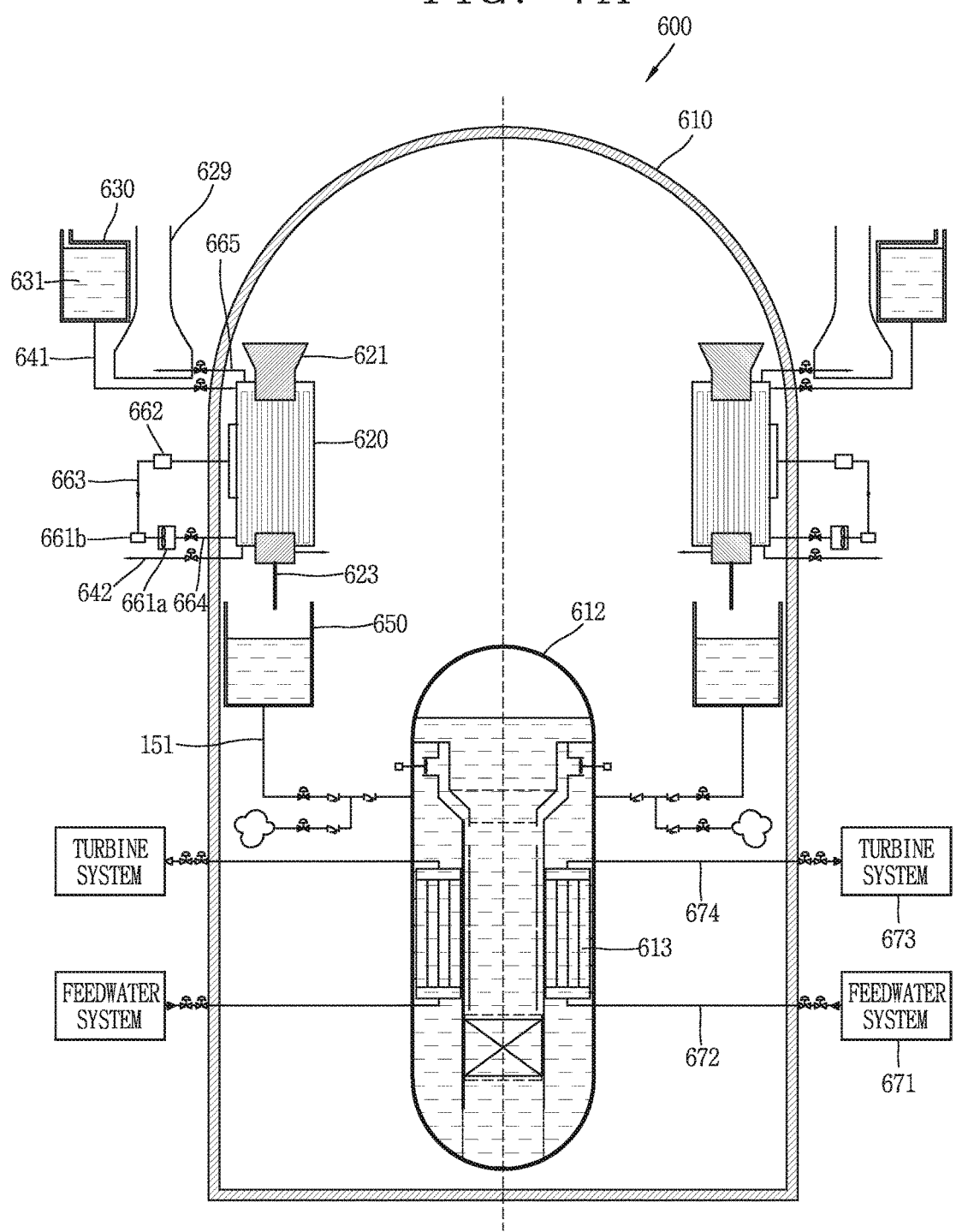
FIGS. 7A and 7B are conceptual views illustrating a state during a normal operation and a state upon an occurrence of an accident, in relation to a passive safety system and a nuclear power plant having the same in accordance with another embodiment of the present invention.
Figure 7B:
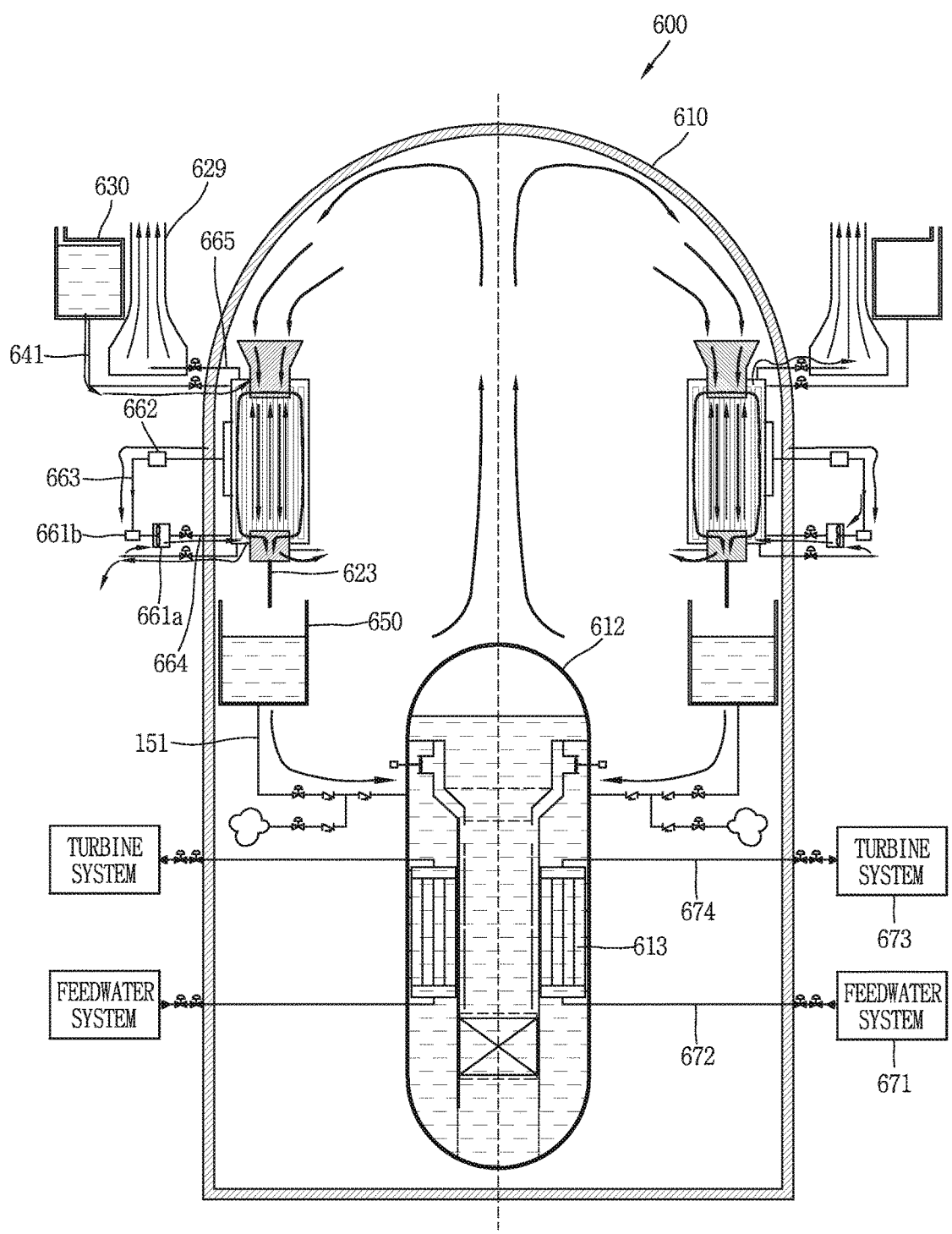

FIGS. 7A and 7B are conceptual views illustrating a state during a normal operation and a state upon an occurrence of an accident, in relation to a passive safety system and a nuclear power plant 600 having the same in accordance with another embodiment of the present invention.

FIG. 7A illustrates a normal operation state of the passive safety system and the nuclear power plant 600 according to one embodiment, and FIG. 7B is a conceptual view illustrating a state upon an occurrence of an accident in the embodiment illustrated in FIG. 7A.

First, referring to FIG. 7A, a nuclear power plant according to one embodiment includes a passive safety system such as a passive containment cooling system. The passive safety system includes a heat exchanger 620 arranged within a containment 610, an emergency cooling fluid storage section 630, cooling fluid flow paths 641 and 642, and an external cooling fluid flow path 664 along which an external cooling fluid of the containment 610 is introduced into the heat exchanger 620, and a duct unit 629. Also, a fan unit 661a is disposed on the external cooling fluid flow path 664, such that the external cooling fluid of the containment 610 can be introduced into the heat exchanger 620.

Other components are similar/like to those of the foregoing embodiments, so description will be given for clarity of explanation.

Referring to FIG. 7B, a left drawing of FIG. 7B illustrates flows of fluid and electricity in the earliest stages of an accident, and a right drawing of FIG. 7B illustrates flows of fluid and electricity in the mid to late stages of the accident.

Hereinafter, an operation of the passive safety system according to this embodiment upon an occurrence of an accident will be described, with reference to those drawings.

in the earliest stages of the accident occurred within the containment 610, internal atmosphere of the containment 610 is introduced into the heat exchanger 620 and an emergency cooling fluid 631 stored in the emergency cooling fluid storage section 630 is introduced into the heat exchanger 620. Therefore, the emergency cooling fluid 631 can lower temperature and pressure of the internal atmosphere of the containment 610 at the beginning of the accident. Electric power generated from the thermoelectric element 20c (see FIG. 1B) through the heat exchange is supplied to the charging unit 662 and the fan unit 661a. In this instance, the emergency cooling fluid and the internal atmosphere of the containment 610 perform the heat exchange within the heat exchanger 620, and thus the fan unit 661a may not be driven.

In the mid to late stages of the accident within the containment 610, the emergency cooling fluid stored within the emergency cooling fluid storage section 630 performs the heat exchange through the heat exchanger 620 and thereafter is totally discharged out of the containment 610 through a lower portion of the heat exchanger 620. Afterwards, the internal atmosphere of the containment 610 and an external cooling fluid of the containment 610 perform the heat exchange with each other. To this purpose, the fan unit 661a starts to be driven. As the fan unit 661a is driven, the external cooling fluid of the containment 610 is introduced more well into the heat exchanger 620, performs the heat exchange with the internal atmosphere of the containment 610 within the heat exchanger 620, and then is discharged out of the containment 610 through an upper portion of the heat exchanger 620. The external cooling fluid of the containment 610 discharged through the heat exchanger 620 is introduced into the duct unit 629 and then discharged out of an upper portion of the duct unit 629.

The operations of the components and others are similar/like to those in the foregoing embodiments, so description thereof will be omitted for clarity of explanation.

Figure 8:
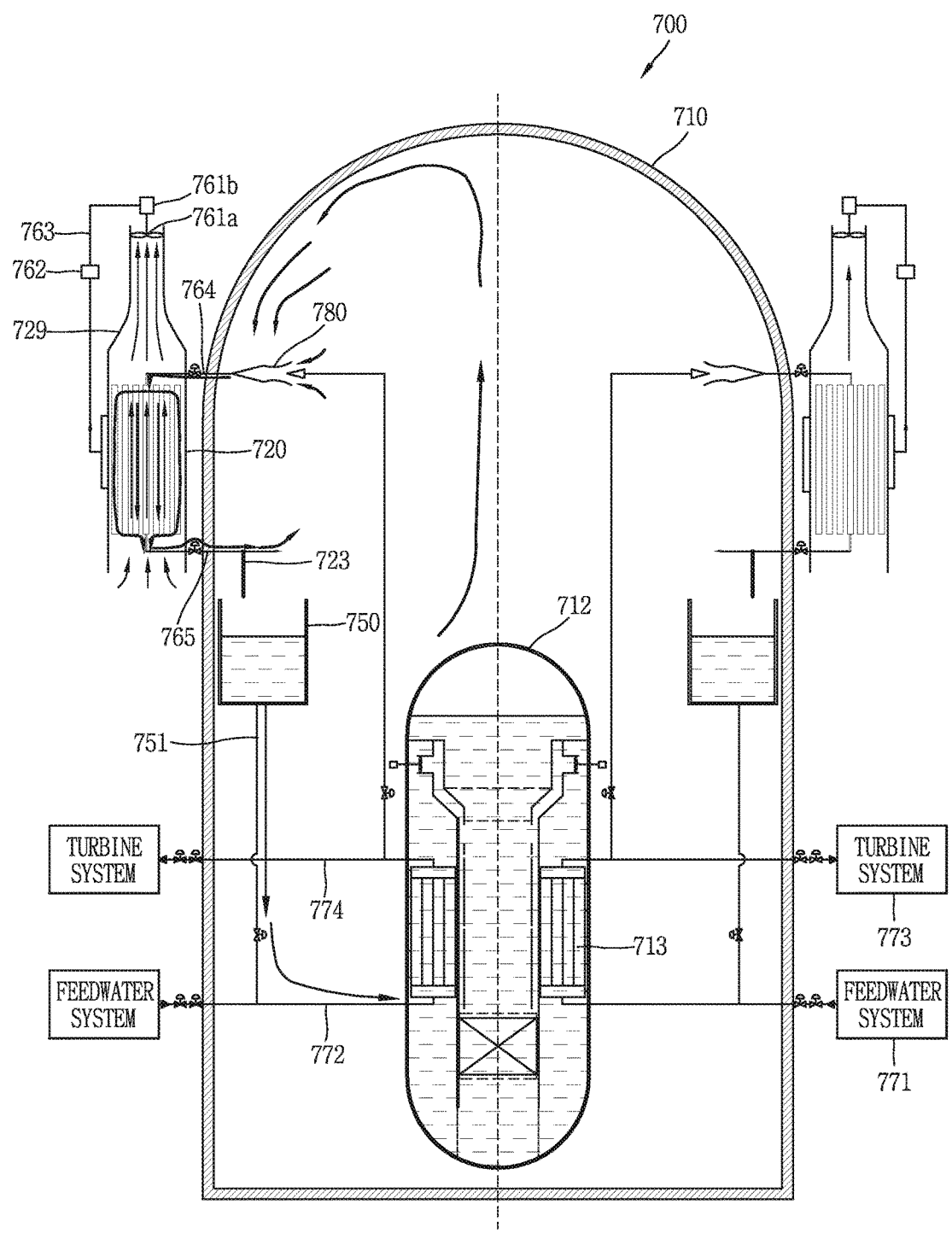
FIG. 8 is a conceptual view illustrating a state during a normal operation and a state upon an occurrence of an accident, in relation to a passive safety system and a nuclear power plant having the same in accordance with another embodiment of the present invention.

FIG. 8 is a conceptual view illustrating a state during a normal operation and a state upon an occurrence of an accident, in relation to a passive safety system and a nuclear power plant 700 having the same in accordance with another embodiment of the present invention.

A nuclear power plant 700 according to this embodiment includes a passive safety system such as a combination of a passive residual heat removal system and a passive containment cooling system. The passive safety system includes a feedwater flow path 772, a steam flow path 774, a heat exchanger 720 disposed outside a containment 710, a duct unit 729 surrounding the heat exchanger 720 and having a flow channel with at least part narrowed (tapered) at an upper portion thereof, an internal atmosphere flow path along which internal atmosphere of the containment 710 is introduced into the heat exchanger 720, and a fan unit 761a disposed at an upper portion of the duct unit 729, to discharge internal atmosphere of the duct unit 729 to outside of the duct unit 729 so as to increase a flow rate of an external cooling fluid passing through the duct unit 729. Also, the passive safety system may further include a circulation increasing facility 780 facilitating an introduction of the internal atmosphere of the containment 710 into the heat exchanger 720.

The feedwater flow path 772 forms a flow channel for injecting fluid into a steam generator 713 provided within the containment 710. The steam flow path 774 is a flow channel through which steam is discharged from the steam generator 713 to flow into a turbine system 773.

The circulation increasing facility 780 may be a jet-pump type facility. The circulation increasing facility 780 may be configured to induce strong atmosphere flow (flow of steam) toward an inlet side of the internal atmosphere flow path such that the internal atmosphere of the containment 710 can be introduced into the heat exchanger 720 through the internal atmosphere flow path. Accordingly, non-condensable gas may not be accumulated around the heat exchanger 720 and a flow rate can increase, thereby remarkably increasing the efficiency of the heat exchanger 720. Also, an amount of circulated internal atmosphere of the containment 710 can greatly increase so as to effectively decrease the pressure and temperature. And, the aforementioned processes can bring about a circulation of the passive containment cooling system.

In addition, the circulation increasing facility 780 may be connected to the steam flow path 774 as the flow channel of the turbine system 773 connected to the reactor coolant system 712. The circulation increasing facility 780 may receive the strong flow transferred from steam flow path 774.

A condensed fluid storage section 750 may be provided below a discharge path 723 within the containment 710. The condensed fluid storage section 750 stores therein fluid condensed from atmosphere passed through the heat exchanger 720.

The condensed fluid storage section 750 may be connected to the feedwater flow path 772 as a flow channel of a feedwater system 771 for injecting the fluid into the steam generator 713 provided within the reactor coolant system 712. Therefore, the fluid stored in the condensed fluid storage section 750 can be injected to the feedwater flow path 772.

Through the aforementioned processes, a circulation of a secondary system of the passive residual heat removal system can be carried out.

In detail, the condensed fluid stored in the condensed fluid storage section 750 is injected to the feedwater flow path 772, and thereafter transferred to the steam generator 713. In addition, steam generated in the steam generator 713 flows out along the steam flow path 774. The flowed-out steam is branched from the steam flow path 774 to flow into a flow path connected to the circulation increasing facility 780.

Accordingly, the steam generated in the steam generator 713 can be supplied into the circulation increasing facility 780, so as to be introduced into an introduction flow path 764 through which the internal atmosphere of the containment 710 is introduced into the heat exchanger 720.

Through the aforementioned processes, the internal atmosphere (or steam) of the containment 710 is introduced into the heat exchanger 720 together with the steam generated from the steam generator 713. And, the steam generated from the steam generator 713 and an external cooling fluid of the containment 710, which can perform heat exchange with the internal atmosphere of the containment 710, are introduced into the heat exchanger 720. The external cooling fluid is introduced into a lower portion of the duct unit 729 surrounding the heat exchanger 720, introduced into the heat exchanger 720 and then flows up along a flow path. The flowed-up external cooling fluid is discharged out of an upper portion of the heat exchanger 720 and then flows through an upper portion of the duct unit 729.

In this instance, the fan unit 761a is disposed at the upper portion of the duct unit 729, to allow internal atmosphere of the duct unit 729 to be discharged out of the duct unit 729. The fan unit 761a may be driven by using electric power generated through the heat exchange within the heat exchanger 720. Also, the fan unit 761a may be arranged at an arbitrary appropriate position on the duct unit 729.

The operations of the components and others are similar/like to those in the foregoing embodiments, so description thereof will be omitted for clarity of explanation.

Figure 9:
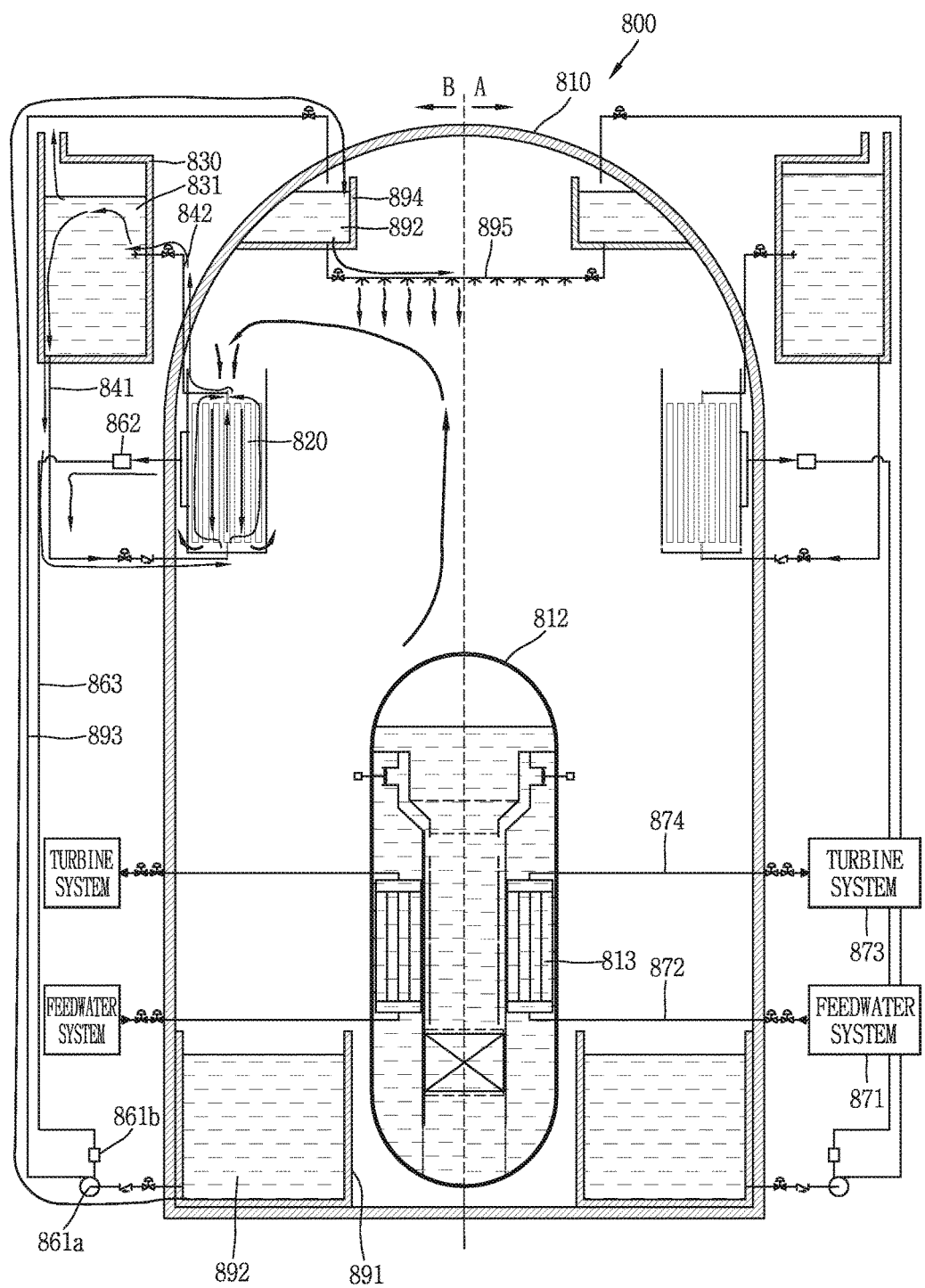
FIG. 9 is a conceptual view illustrating a state during a normal operation and a state upon an occurrence of an accident, in relation to a passive safety system and a nuclear power plant having the same in accordance with another embodiment of the present invention.

FIG. 9 is a conceptual view illustrating a state during a normal operation and a state upon an occurrence of an accident, in relation to a passive safety system and a nuclear power plant 800 having the same in accordance with another embodiment of the present invention.

A nuclear power plant 800 according to another one embodiment includes a passive safety system such as a passive containment cooling system and a feedwater system. The passive safety system may include a heat exchanger 820 arranged within a containment 810, an emergency cooling fluid storage section 830 supplying a cooling fluid 831 to the heat exchanger 820 upon an occurrence of an accident, a cooling fluid storage section 891, a spray device 895, and a pump unit 861a.

The cooling fluid storage section 891 is formed within the containment 810, and stores a cooling fluid 892 for reducing internal pressure or temperature of the containment 810. The cooling fluid storage section 891 is provided separate from the emergency cooling fluid storage section 830.

The spray device 895 may be disposed at an upper side within the containment 810. And, when an accident occurs within the containment 810, the spray device 895 may receive the cooling fluid and spray the received cooling fluid into the containment 810.

The pump unit 861a is arranged on a fluid supply channel 893 which connects the cooling fluid storage section 891 and the spray device 895. When the pump unit 861a is driven, the cooling fluid stored in the cooling fluid storage section 891 is supplied to the spray device 895 to be sprayed out.

Also, a second cooling fluid storage section 894 in which the cooling fluid supplied from the cooling fluid storage section 891 by the pump unit 861a is temporarily stored may be formed at an upper portion of the spray device 895 within the containment 810. However, unlike the configuration illustrated in the drawing, the second cooling fluid storage section 894 may not be provided. In this instance, the fluid supplied by the pump unit 861a may immediately be supplied to the spray device 895 to be sprayed out.

Other components are similar/like to those of the foregoing embodiments, so description will be omitted for clarity of explanation. Hereinafter, an operation of the passive safety system according to this embodiment upon an occurrence of an accident will be described.

Upon an occurrence of an accident, a cooling fluid stored in the emergency cooling fluid storage section 830 is supplied into the heat exchanger 820. The internal atmosphere of the containment 810 is introduced into the heat exchanger 820 to perform a heat exchange with the cooling fluid. During this process, electric power generated by the thermoelectric element is supplied to the pump unit 861a and a charging unit disposed adjacent to the cooling fluid storage section 891. The cooling fluid supplied to the heat exchanger 820 is then supplied back to the emergency cooling fluid storage section 830 through a return flow path 842.

The cooling fluid storage section 891 is connected to the second cooling fluid storage section 894 via the fluid supply channel 893. The pump unit 861a is arranged on the fluid supply channel 893. As the pump unit 861a is driven, the cooling fluid stored in the cooling fluid storage section 891 may be supplied into the second cooling fluid storage section 894. The cooling fluid supplied to the second cooling fluid storage section 894 may be sprayed into the containment 810 through the spray device 895.

Internal temperature or pressure of the containment 810 can be decreased by virtue of the spraying of the spray device 895.

The operations of the components and others are similar/like to those in the foregoing embodiments, so description will be omitted for clarity of explanation.

Figure 10:
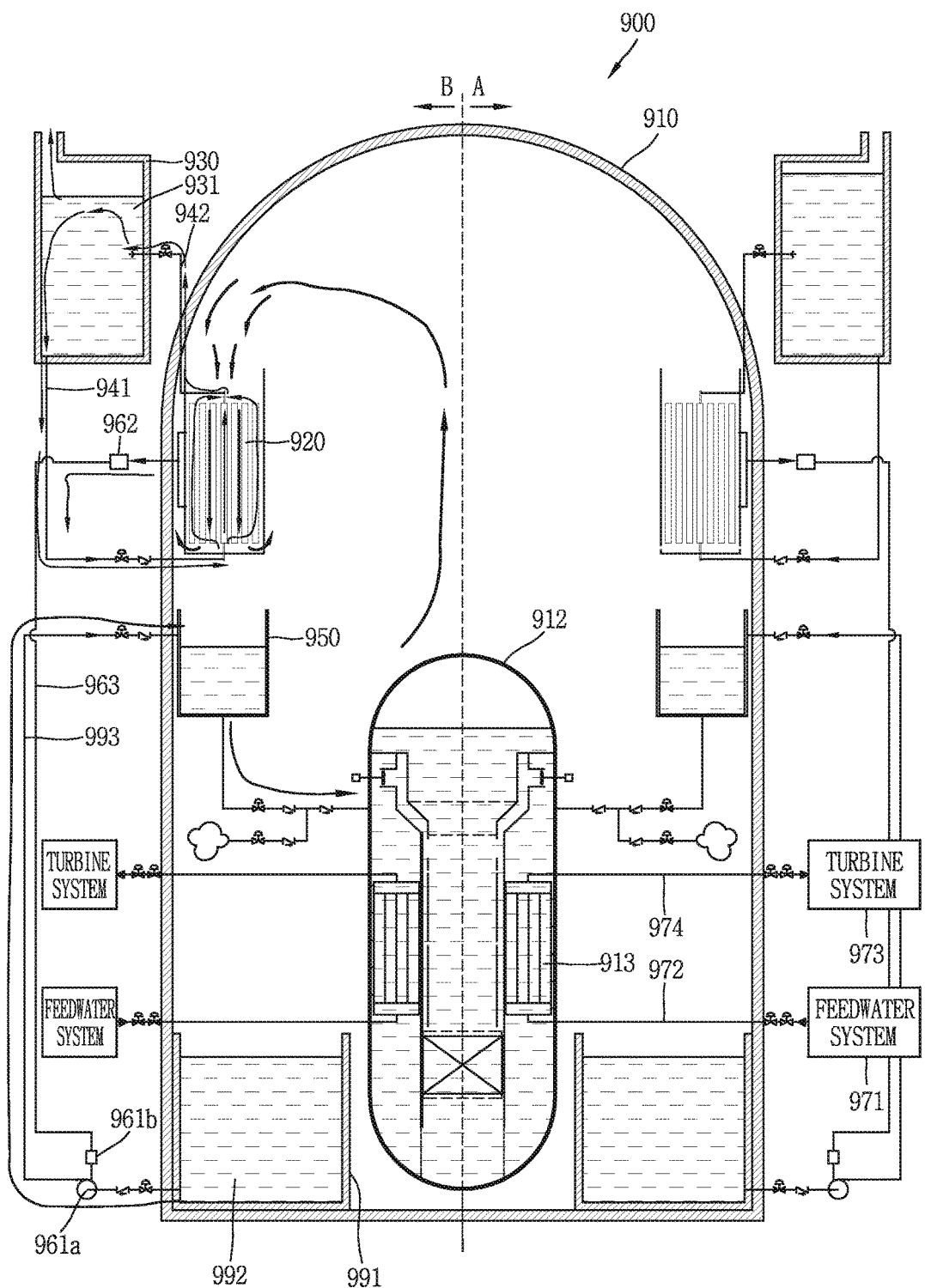
FIG. 10 is a conceptual view illustrating a state during a normal operation and a state upon an occurrence of an accident, in relation to a passive safety system and a nuclear power plant having the same in accordance with another embodiment of the present invention.

FIG. 10 is a conceptual view illustrating a state during a normal operation and a state upon an occurrence of an accident, in relation to a passive safety system and a nuclear power plant 900 having the same in accordance with another embodiment of the present invention.

A nuclear power plant 900 according to this embodiment includes a passive safety system such as a passive containment cooling system. The passive safety system is similar to that illustrated in the embodiment of FIG. 9. However, the passive safety system according to this embodiment does not include a spray device and a second cooling fluid storage section, but includes an emergency cooling fluid storage section 930, a heat exchanger 920 arranged within a containment 910, a cooling fluid storage section 991, a fluid supply channel 993, and a pump unit 961a arranged on the fluid supply channel 993. Also, the passive safety system further includes a condensate storage section 950 for storing condensate which is generated as temperature of the atmosphere inside the containment 910 supplied into the heat exchanger 920 is decreased. The fluid supply channel 993 is configured to connect the cooling fluid storage section 991 and the condensate storage section 950.

Other components are similar/like to those of the foregoing embodiments, so description will be given for clarity of explanation. Hereinafter, an operation of the passive safety system according to this embodiment upon an occurrence of an accident will be described.

Upon an occurrence of an accident, an emergency cooling fluid 931 stored in the emergency cooling fluid storage section 930 is introduced into a lower portion of the heat exchanger 920, discharged through an upper portion of the heat exchanger 920, and then returned back into the emergency cooling fluid storage section 930. The internal atmosphere of the containment 910 is introduced into an upper portion of the heat exchanger 920, and then discharged through a lower portion of the heat exchanger 920. The condensate is generated in response to temperature drop while the internal atmosphere of the containment 910 is introduced and discharged. The condensate is collected in the condensate storage section 950 arranged below the heat exchanger 920.

Also, electric power generated from the heat exchanger 920 is supplied to the pump unit 961a, which are arranged on the fluid supply channel 993 connecting the cooling fluid storage section 991 and the condensate storage section 950 to each other, and a charging unit 962. When the pump unit 961a is driven, the cooling fluid stored in the cooling fluid storage section 991 is transferred to the condensate storage section 950.

The condensate storage section 950 collects therein the condensate discharged from the heat exchanger 920 and the cooling fluid stored in the cooling fluid storage section 991. The collected fluid may be injected into the reactor cooling system through a safety injection system.

However, unlike the configuration illustrated in the drawing, the condensate storage section 950 may not be provided. In this instance, the fluid supplied from the pump unit 961a may be directly supplied into the safety injection system, thereby being used for safety injection.

Figure 11:
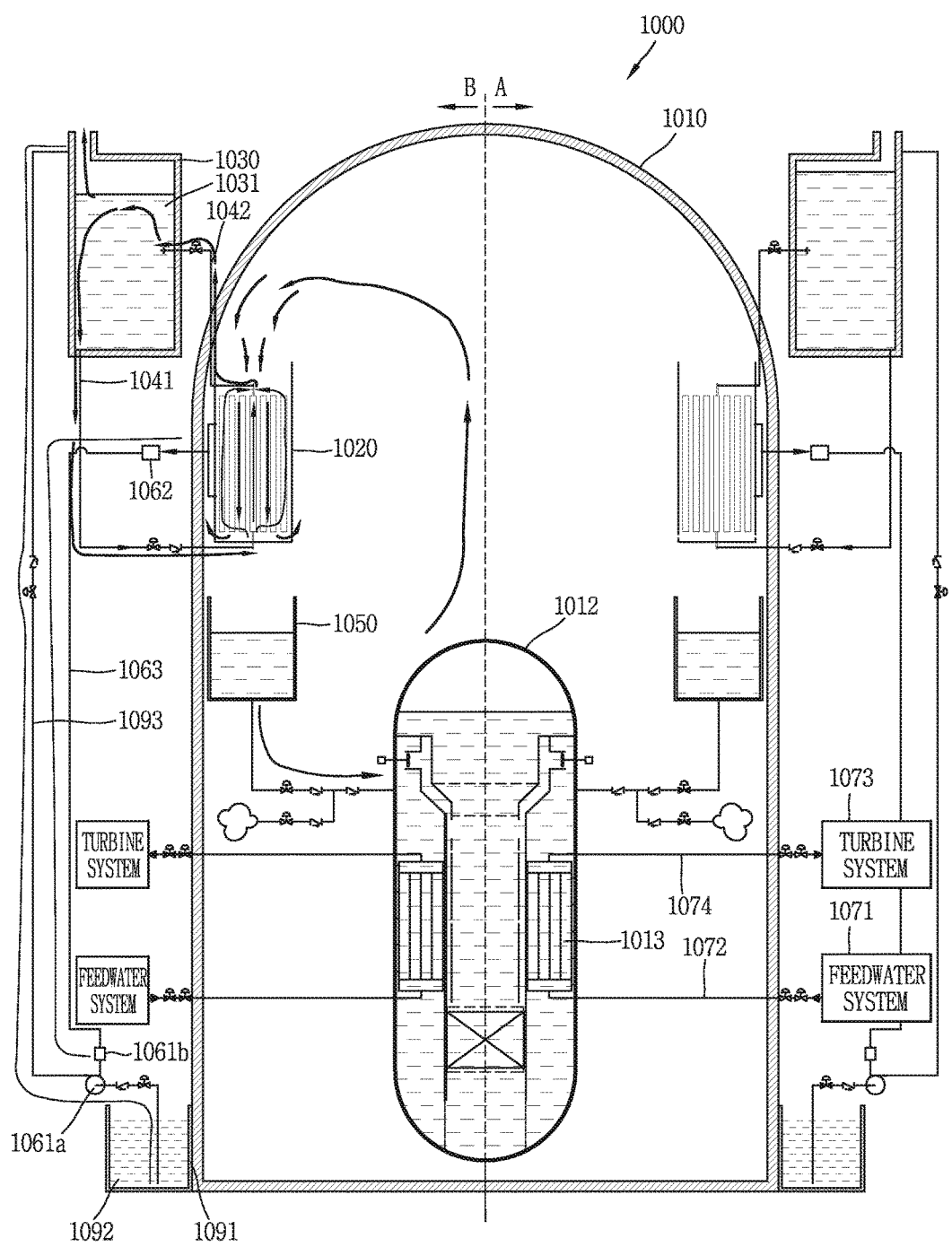
FIG. 11 is a conceptual view illustrating a state during a normal operation and a state upon an occurrence of an accident, in relation to a passive safety system and a nuclear power plant having the same in accordance with another embodiment of the present invention.

FIG. 11 is a conceptual view illustrating a state during a normal operation and a state upon an occurrence of an accident, in relation to a passive safety system and a nuclear power plant 1000 having the same in accordance with another embodiment of the present invention.

A nuclear power plant 1000 according to another embodiment includes a passive safety system such as a passive containment cooling system. The passive safety system includes a cooling fluid storage section 1091 installed outside a containment 1010, and a fluid supply channel 1093 connecting the cooling fluid storage section 1091 to an emergency cooling fluid storage section 1030. However, unlike configuration illustrated in the drawing, the cooling fluid storage section 1091 may also be installed inside the containment 1010.

Other components are similar/like to those of the foregoing embodiments, so description will be given for clarity of explanation. Hereinafter, an operation of the passive safety system according to this embodiment upon an occurrence of an accident will be described.

Upon an occurrence of an accident, the cooling fluid stored in the emergency cooling fluid storage section 1030 is introduced into a lower portion of the heat exchanger 1020, discharged through an upper portion of the heat exchanger 1020, and then returned back into the emergency cooling fluid storage section 1030. Internal atmosphere of the containment 1010 is introduced into the upper portion of the heat exchanger 1020 and then discharged through the lower portion of the heat exchanger 1020.

Electric power generated during this process is supplied to a pump unit 1061a and a charging unit which are arranged on the fluid supply channel 1093 connecting the cooling fluid storage section 1091 to the emergency cooling fluid storage section 1030. When the pump unit 1061a is driven, the cooling fluid stored in the cooling fluid storage section 1091 is supplied into the emergency cooling fluid storage section 1030.

The cooling fluid stored in the emergency cooling fluid storage section 1030 is returned after supplied into the heat exchanger 1020. However, temperature of the cooling fluid may increase during the heat exchange and thus the cooling fluid may be evaporated. Due to the evaporation, a water level of the cooling fluid stored in the emergency cooling fluid storage section 1030 may be decreased. In this instance, when the pump unit 1061a is driven, the cooling fluid stored in the cooling fluid storage section 1091 is supplied to the emergency cooling fluid storage section 1030.

Also, when a predetermined water level of the cooling fluid within the emergency cooling fluid storage section 1030 is maintained, even though power can be supplied sufficiently to a charging unit 1062, the pump unit 1061a could not be driven by a related signal. This is for preventing the cooling fluid from flowing over the emergency cooling fluid storage section 1030 owing to the driving of the pump unit 1061a. Accordingly, an amount of the cooling fluid stored in the emergency cooling fluid storage section 1030 can be maintained for a long term of time, which may result in increasing a time for carrying out the heat exchange.

The operations of the components and others are similar/like to those in the foregoing embodiments, so description will be omitted for clarity of explanation.

Figure 12:
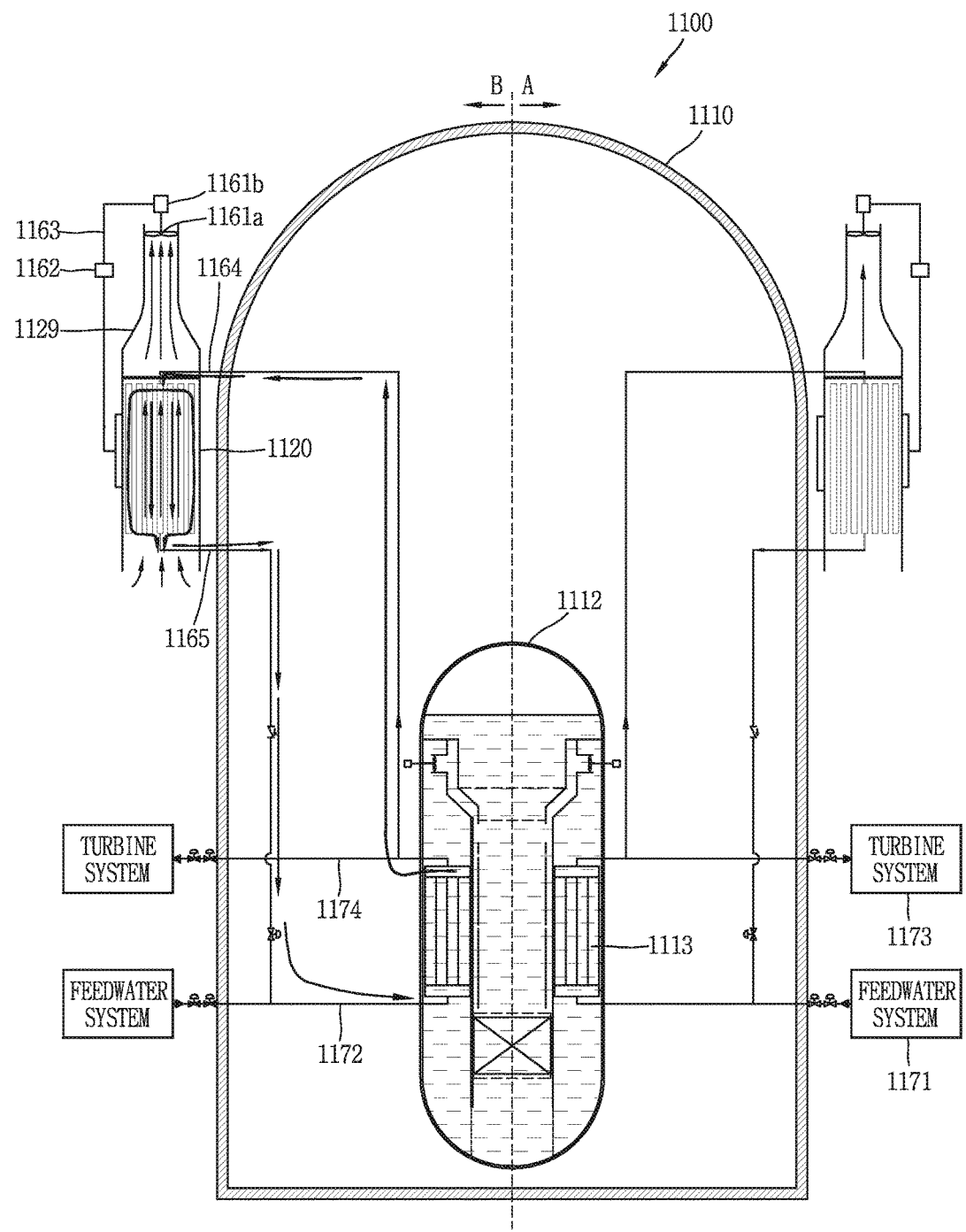
FIG. 12 is a conceptual view illustrating a state during a normal operation and a state upon an occurrence of an accident, in relation to a passive safety system and a nuclear power plant having the same in accordance with another embodiment of the present invention.

FIG. 12 is a conceptual view illustrating a state during a normal operation and a state upon an occurrence of an accident, in relation to a passive safety system and a nuclear power plant 1100 having the same in accordance with another embodiment of the present invention.

A nuclear power plant 1100 according to another embodiment includes a passive safety system such as a passive containment cooling system. The passive safety system includes a feedwater flow path 1172, a steam flow path 1174, a heat exchanger 1120 arranged outside a containment 1110, a duct unit 1129 surrounding the heat exchanger 1120, and a fan unit 1161a.

The heat exchanger 1120 may be arranged outside the containment 1110. The heat exchanger 1120 may receive steam supplied along the steam flow path 1174 and discharge condensate, which has passed through the heat exchanger 1120, through the feedwater flow path 1172.

The duct unit 1129 is configured such that an external cooling fluid is introduced into a lower portion of the heat exchanger 1120 to be discharged through an upper portion of the heat exchanger 1120. The duct unit 1129 may be formed such that at least part of a flow channel thereof is narrowed (tapered) toward an upper portion.

The fan unit 1161a may be disposed within an upper portion of the duct unit 1129. The fan unit 1161a may allow the cooling fluid within the duct unit 1129 to be blown out through the upper portion thereof, such that the external cooling fluid of the containment 1110 can much faster flow within the duct unit 1129. This embodiment illustrates that the fan unit 1161a is disposed within the upper portion of the duct unit 1129, but the fan unit 1161a may alternatively be arranged at an appropriate position of the duct unit 1129 according to a design characteristic of the nuclear power plant.

Other components are similar/like to those of the foregoing embodiments, so description will be given for clarity of explanation. Hereinafter, an operation of the passive safety system according to this embodiment upon an occurrence of an accident will be described.

The heat exchanger 1120 is arranged outside the containment 1110. The steam flow path 1174 is connected directly to the upper portion of the heat exchanger 1120, such that steam can be introduced directly into the upper portion of the heat exchanger 1120 along the steam flow path 1174 upon an occurrence of an accident. And, the lower portion of the heat exchanger 1120 is connected directly to the feedwater flow path 1172 and thus the steam passed through the heat exchanger 1120 is discharged directly into the feedwater flow path 1172.

The fan unit 1161a is arranged in an upper portion of the duct unit 1129. When electric power is supplied from the thermoelectric element arranged in the heat exchanger 1120, the fan unit 1161a blows air within the duct unit 1129 to be well discharged out of the duct unit 1129. Accordingly, a flow rate of the external cooling fluid which is introduced into the lower portion of the duct unit 1129 and then introduced into the heat exchanger 1120 increases, and efficiency of the heat exchanger 1120 is enhanced accordingly.

The passive safety system and the nuclear power plant having the same described above may not be limited to the configurations and methods of the foregoing embodiments, but a part or all of the embodiments can selectively be combined to make various modifications.

INDUSTRIAL AVAILABILITY

The embodiments of the present invention propose a passive safety system having a plate type heat exchanger provided therein a thermoelectric element producing electricity by a temperature difference, and a nuclear power plant having the passive safety system, and thus can be applied to various related industrial fields.

The invention claimed is:
1. A passive safety system, comprising:
a passive containment cooling system;
a heat exchanger
  formed at a space inside a hermetic containment, and
  allowing heat exchange of internal atmosphere of the containment introduced therein,
    such that temperature of the internal atmosphere is reduced,
      when an accident occurs in a reactor system disposed within the containment;
a thermoelectric element disposed within the heat exchanger and configured to produce electricity
  due to a temperature difference between the internal atmosphere and a cooling fluid, heat-exchanged with the internal atmosphere,
  when the cooling fluid performs the heat exchange with the internal atmosphere within the heat exchanger; and
a fan unit
  connected to the thermoelectric element via an electricity path to receive the electricity produced from the thermoelectric element and
  configured to form a flow of fluid inside the containment.
2. The system of claim 1, wherein the fan unit is configured to increase a flow rate of the cooling fluid passing through the heat exchanger, to facilitate the heat exchange between the internal atmosphere and the cooling fluid within the heat exchanger.
3. The system of claim 2, wherein the heat exchanger is arranged within the containment such that the internal atmosphere is introduced directly into the heat exchanger.
4. The system of claim 3, further comprising:
an emergency cooling fluid storage section configured to store an emergency cooling fluid introduced into the heat exchanger for the heat exchange with the internal atmosphere upon an occurrence of an accident; and
cooling fluid flow paths configured to connect the emergency cooling fluid storage section to the heat exchanger such that the emergency cooling fluid is introduced into the heat exchanger.
5. The system of claim 4, wherein the fan unit is configured to blow the internal atmosphere toward the heat exchanger, to facilitate steam discharged from the reactor system to be introduced into the heat exchanger from a portion above the heat exchanger.
6. The system of claim 1, further comprising:
an emergency cooling fluid storage section configured to store an emergency cooling fluid introduced into the heat exchanger for the heat exchange with the internal atmosphere upon an occurrence of an accident; and
a circulation flow path configured to allow the emergency cooling fluid within the emergency cooling fluid storage section to be circulated within the heat exchanger and the emergency cooling fluid storage section therethrough,
wherein the fan unit is located inside the containment and arranged on an internal atmosphere introduction flow path to introduce the internal atmosphere into the heat exchanger.
7. The system of claim 1, wherein the electricity path is provided with a charging unit disposed on the electricity path to store the electricity produced from the thermoelectric element so as to supply the electricity to the fan unit.
8. The system of claim 1, wherein the heat exchanger is configured as an air-cooling type.
9. The system of claim 8, further comprising:
an emergency cooling fluid storage section configured to store the emergency cooling fluid introduced into the heat exchanger for the heat exchange with the internal atmosphere; and
a cooling fluid flow path configured to connect the emergency cooling fluid storage section to the heat exchanger such that the emergency cooling fluid is introduced into the heat exchanger.
10. The system of claim 9, wherein a pump unit is disposed on the cooling fluid flow path such that the emergency cooling fluid is efficiently introduced into the heat exchanger,
the pump unit allowing the emergency cooling fluid to be supplied from the emergency cooling fluid storage section into the heat exchanger.
11. The system of claim 8, further comprising:
a cooling fluid storage section disposed adjacent to the containment to store therein the cooling fluid for reducing the internal temperature of the containment; and
a spray device disposed at an upper side within the containment and configured to spray the cooling fluid supplied from the cooling fluid storage section into the containment when an accident occurs within the containment,
wherein a pump unit is disposed on a fluid supply flow path for connecting the cooling fluid storage section and the spray device to each other, to supply the cooling fluid into the spray device by using the electricity produced from the thermoelectric element arranged in the heat exchanger.
12. The system of claim 9, further comprising:
a cooling fluid storage section disposed adjacent to the containment to store therein the cooling fluid for reducing the internal temperature of the containment; and
a safety injection system configured to inject fluid into the reactor system when an accident occurs in the reactor system,
wherein a pump unit is disposed on a fluid supply flow path for connecting the safety injection system to the cooling fluid storage section to supply the cooling fluid to the safety injection system by using the electricity produced from the thermoelectric element arranged in the heat exchanger such that the safety injection system injects the cooling fluid into the reactor system.

13. The system of claim 9, further comprising a cooling fluid storage section disposed adjacent to the containment to store therein the cooling fluid for reducing the internal temperature of the containment, wherein a pump unit is configured to introduce the cooling fluid stored in the cooling fluid storage section into the emergency cooling fluid storage section when a water level of the emergency cooling fluid storage section is decreased.

\* \* \* \* \*